United States Patent
Wu et al.

(10) Patent No.: US 12,537,461 B2
(45) Date of Patent: Jan. 27, 2026

(54) MULTI-LEVEL CONTROLLER WITH LOOKUP TABLE

(71) Applicant: Murata Manufacturing Co., Ltd., Kyoto (JP)

(72) Inventors: Gary Chunshien Wu, San Diego, CA (US); Gregory Szczeszynski, Nashua, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 18/354,329

(22) Filed: Jul. 18, 2023

(65) Prior Publication Data
US 2025/0030339 A1   Jan. 23, 2025

(51) Int. Cl.
*H02M 7/483* (2007.01)
*H02M 3/157* (2006.01)

(52) U.S. Cl.
CPC ......... *H02M 7/4837* (2021.05); *H02M 3/157* (2013.01)

(58) Field of Classification Search
CPC .. H02M 7/4837; H02M 7/483; H02M 1/0095; H02M 3/07; H02M 3/157
See application file for complete search history.

(56) References Cited

U.S. PATENT DOCUMENTS

| | | | |
|---|---|---|---|
| 9,929,653 B1 * | 3/2018 | Mercer | H02M 7/4837 |
| 10,686,367 B1 | 6/2020 | Low | |
| 10,720,842 B1 | 7/2020 | Wu et al. | |
| 10,720,843 B1 | 7/2020 | Wu et al. | |
| 10,770,974 B2 | 9/2020 | Wu et al. | |
| 10,992,226 B1 | 4/2021 | Aboueldahab et al. | |
| 2020/0228015 A1 * | 7/2020 | Wu | H02M 3/158 |
| 2023/0148059 A1 | 5/2023 | Szczeszynski et al. | |
| 2024/0055862 A1 * | 2/2024 | Pahlevaninezhad | H02M 1/0064 |

* cited by examiner

*Primary Examiner* — Alex Torres-Rivera
(74) *Attorney, Agent, or Firm* — Haynes and Boone, LLP

(57) ABSTRACT

A controller for a multi-level power converter that utilizes a look-up-table (LUT) in combination with a fast flash analog-to-digital converter (ADC) circuit to implement a complex set of control states for the multi-level power converter. Since the set of control states can be pre-processed, a LUT is very well suited for such selecting such control states. This technique can be fast because the delay is only the LUT access time, rather than the propagation delay through a complex network of combinational logic. The fast flash ADC has been designed to achieve all the following: high conversion speed, high resolution, small layout area, low power, and the ability to meet the requirements for properly balancing fly capacitor voltages in a multi-level converter cell.

21 Claims, 13 Drawing Sheets

| Positive Inductor L Current | Level 1 | Level 2 | | | Level 3 | | | | | | | Level 4 | | | | Level 5 |
|---|---|---|---|---|---|---|---|---|---|---|---|---|---|---|---|---|
| | | Upper Switch Settings (Lower Switch settings are complements) | | | | | | | | | | | | | | |
| | 0000 | 1000 | 0100 | 0010 | 0001 | 1100 | 0110 | 0011 | 1001 | 1010 | 0101 | 1110 | 0111 | 1011 | 1101 | 1111 |
| C1 | 0 | 0 | 0 | 1 | -1 | 0 | 1 | 0 | -1 | 1 | -1 | 1 | 0 | 0 | -1 | 0 |
| C2 | 0 | 0 | 1 | -1 | 0 | 1 | 0 | -1 | 0 | -1 | 1 | 0 | 0 | -1 | 1 | 0 |
| C3 | 0 | 1 | -1 | 0 | 0 | 0 | -1 | 1 | 1 | 0 | -1 | 0 | -1 | 1 | 0 | 0 |

-1 = discharge; 0 = no change; 1 = charge

FIG. 5B

| Negative Inductor L Current | Level 1 | Level 2 | | | Level 3 | | | | | | | Level 4 | | | | Level 5 |
|---|---|---|---|---|---|---|---|---|---|---|---|---|---|---|---|---|
| | | Upper Switch Settings (Lower Switch settings are complements) | | | | | | | | | | | | | | |
| | 0000 | 1000 | 0100 | 0010 | 0001 | 1100 | 0110 | 0011 | 1001 | 1010 | 0101 | 1110 | 0111 | 1011 | 1101 | 1111 |
| C1 | 0 | 0 | 0 | -1 | 1 | 0 | -1 | 0 | 1 | -1 | 1 | -1 | 0 | 0 | 1 | 0 |
| C2 | 0 | 0 | -1 | 1 | 0 | -1 | 0 | 1 | 0 | 1 | -1 | 0 | 0 | 1 | -1 | 0 |
| C3 | 0 | -1 | 1 | 0 | 0 | 0 | 1 | -1 | -1 | 0 | 1 | 0 | 1 | -1 | 0 | 0 |

-1 = discharge; 0 = no change; 1 = charge

FIG. 5C

MULTI-LEVEL CONTROLLER WITH LOOKUP TABLE

BACKGROUND

(1) Technical Field

This invention relates to electronic circuits, and more particularly to controllers for multi-level power converters.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as a battery, solar cells, and rectified AC sources. Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output. Some power converters may output a current as a function of a generated voltage derived from an input voltage.

One type of direct current power converter known as a multi-level power converter includes charge transfer capacitors as energy storage elements coupled by controlled power switches so as to transfer charge from $V_{IN}$ to $V_{OUT}$. Such charge transfer capacitors are commonly known as "fly capacitors" or "pump capacitors". Every time a fly capacitor is used (i.e., not bypassed), the electrical energy flowing through that fly capacitor generally either charges it or discharges it. This creates a control problem: what configurations and in what order can the fly capacitors be switched while maintaining their average voltage? This is the charge-balance problem that multi-level converter circuits introduce—proper multi-level power converter operation requires fly capacitor voltages to be continuously balanced to corresponding target voltages.

Determining a suitable charge-balance method can become exceedingly difficult as the complexity of a multi-level converter circuit increases. In particular, the complexity of an algorithm for fly capacitor voltage balancing increases dramatically as the number of fly capacitors increases, due to prioritization requirements as well as the inter-dependent and restrictive capacitor voltage control that exists due to limited options for power switch configurations for a particular target level. Most conventional control methods rely on a large and complex network of combinatorial logic to establish a sequence of linked state-changes to try to achieve charge balance. Control systems based on long sequences of power switch states generally assume that all system variables—such as input voltage and output current—are constant during the sequence. This is unrealistic for a real-world environment, where all system variables tend to be dynamic. Further, charge balancing computations should be completed very fast on a cycle-by-cycle basis, especially when the load current on the power converter is very high. High load current changes the fly capacitor voltages very quickly depending on the capacitor values.

Accordingly, there is a need for circuits and methods for more effectively and efficiently balancing the voltage across each fly capacitor of a multi-level converter circuit. The present invention addresses this and other needs.

SUMMARY

The present invention encompasses a controller for a multi-level power converter that utilizes a look-up-table (LUT) in combination with a fast flash analog-to-digital converter (ADC) circuit to implement an algorithm comprising a complex set of control states for the multi-level power converter. Since the algorithm can be pre-processed, a LUT is very well suited for such selecting such control states. This technique can be fast because the delay is only the LUT access time, rather than the propagation delay through a complex network of combinational logic. The fast flash ADC has been designed to achieve all the following: high conversion speed, high resolution, small layout area, low power, and the ability to meet the requirements for properly balancing fly capacitor voltages in a multi-level converter cell.

The algorithm used to balance fly capacitor voltages may need to adapt to changes in conditions and/or configurations—yet a fixed combinational logic has no flexibility for such a task. In particular, the voltage across each fly capacitor is a dynamic variable, the value of which is a useful—and often necessary—factor in determining charge-balance across the fly capacitors of a multi-level converter circuit. For example, the voltage change of certain fly capacitors may be faster than the voltage change of other fly capacitors, and such fast-changing fly capacitors may need a higher priority to balance their voltages. The present invention enables flexible adaptation to such dynamic conditions and/or configurations.

One embodiment encompasses a controller for an M-level power converter cell having one or more fly capacitors coupled to a set of power switches, where M≥3, the controller including: a voltage level selector configured to generate and output a first set of address bits; a set of one or more analog-to-digital converters, each member of the set configured to be coupled to an associated fly capacitor of the one or more fly capacitors and to output a first bit indicative of whether a voltage on the associated fly capacitor is above or below a reference target level, and a second bit indicative of whether the voltage on the associated fly capacitor is within or outside a target window, wherein the first and second bits of the set of one or more analog-to-digital converters collectively comprises a second set of address bits; a look-up table, coupled to the voltage level selector and to the set of one or more analog-to-digital converters, the look-up table storing a set of switch-state selector values and outputting a selected switch-state selector value in response to receipt of an address comprising a concatenation of the first set of address bits and the second set of address bits; and an M-level switch state selector, configured to be coupled to the M-level power converter cell, to receive at least a portion of the selected switch-state selector value from the look-up table, and to generate a set of power switch state settings as a function of the received portion of the selected switch-state selector value.

The details of one or more embodiments of the invention are set forth in the accompanying drawings and the description below. Other features, objects, and advantages of the invention should be apparent from the description and drawings, and from the claims.

DESCRIPTION OF THE DRAWINGS

FIG. 5B is a table showing the effect of switch-state selector values on the power switches of an example 5-level converter cell when the inductor L current is positive.

FIG. 5C is a table showing the effect of switch-state selector values on the power switches of an example 5-level converter cell when the inductor L current is negative.

Like reference numbers and designations in the various drawings indicate like elements.

DETAILED DESCRIPTION

The present invention encompasses a controller for a multi-level power converter that utilizes a look-up-table (LUT) in combination with a fast flash analog-to-digital converter (ADC) circuit to implement an algorithm comprising a complex set of control states for the multi-level power converter. Since the algorithm can be pre-processed, a LUT is very well suited for such selecting such control states. This technique can be fast because the delay is only the LUT access time, rather than the propagation delay through a complex network of combinational logic. The fast flash ADC includes a 2-bit embodiment that has been designed to achieve all the following: high conversion speed, high resolution, small layout area, low power, and the ability to meet the requirements for properly balancing fly capacitor voltages in a multi-level converter cell.

The algorithm used to balance fly capacitor voltages may need to adapt to changes in conditions and/or configurations—yet a fixed combinational logic has no flexibility for such a task. In particular, the voltage across each fly capacitor is a dynamic variable, the value of which is a useful—and often necessary—factor in determining charge-balance across the fly capacitors of a multi-level converter circuit. For example, the voltage change of certain fly capacitors may be faster than the voltage change of other fly capacitors, and such fast-changing fly capacitors may need a higher priority to balance their voltages. The present invention enables flexible adaptation to such dynamic conditions and/or configurations.

Figure 1:
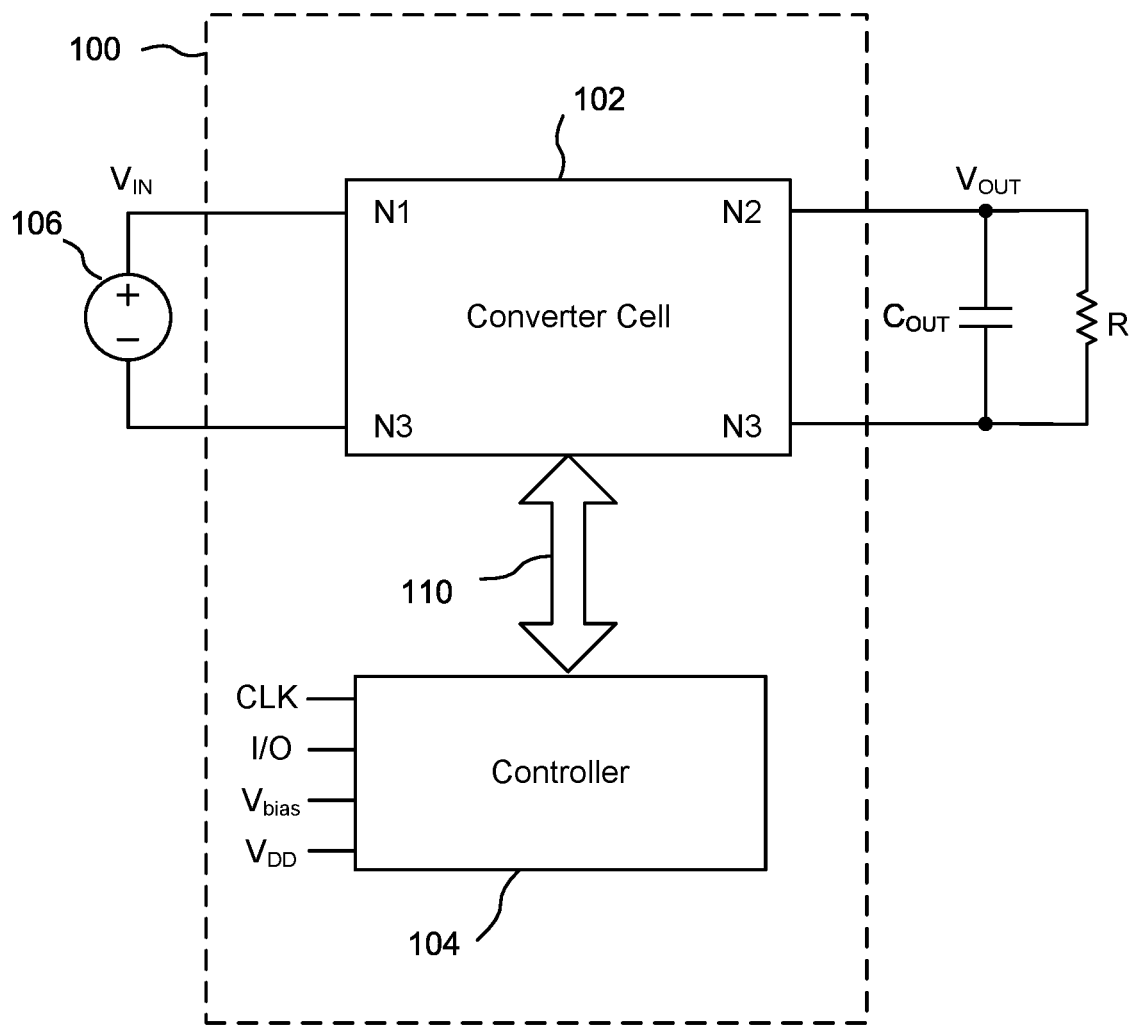
FIG. 1 is a block diagram of a circuit that includes a prior art power converter.

FIG. 1 is a block diagram of a circuit that includes a prior art power converter 100. In the illustrated example, the power converter 100 includes a converter cell 102 and a controller 104. The converter cell 102 is configured to receive an input voltage $V_{IN}$ from a voltage source 106 (e.g., a battery) across terminals N1 and N3 (common), and transform the input voltage $V_{IN}$ into an output voltage $V_{OUT}$ across terminals N2 and N3 (common). The output voltage $V_{OUT}$ is generally coupled across an output capacitor $C_{OUT}$, across which may be connected a load represented as an equivalent resistance R. In some embodiments of the power converter 100, auxiliary circuitry (not shown), such as a bias voltage generator(s), a clock generator, a voltage control circuit, etc., may also be present and coupled to the converter cell 102 and the controller 104.

The controller 104 receives a set of input signals and produces a set of output signals. Some of these input signals arrive along a signal path 110 connected to the converter cell 102. Some input signals carry information indicative of the operational state of the converter cell 102. The controller 104 generally also receives at least a clock/timing signal CLK and one or more external input/output signals I/O that may be analog, digital (encoded or direct signal lines), or a combination of both. Based upon the received input signals, the controller 104 produces a set of control signals back to the converter cell 102 on the signal path 110 that control the internal components of the converter cell 102 (e.g., internal integrated or external discrete switches, such as FETs, especially MOSFETs) to cause the converter cell 102 to convert $V_{IN}$ to $V_{OUT}$.

Figure 2:
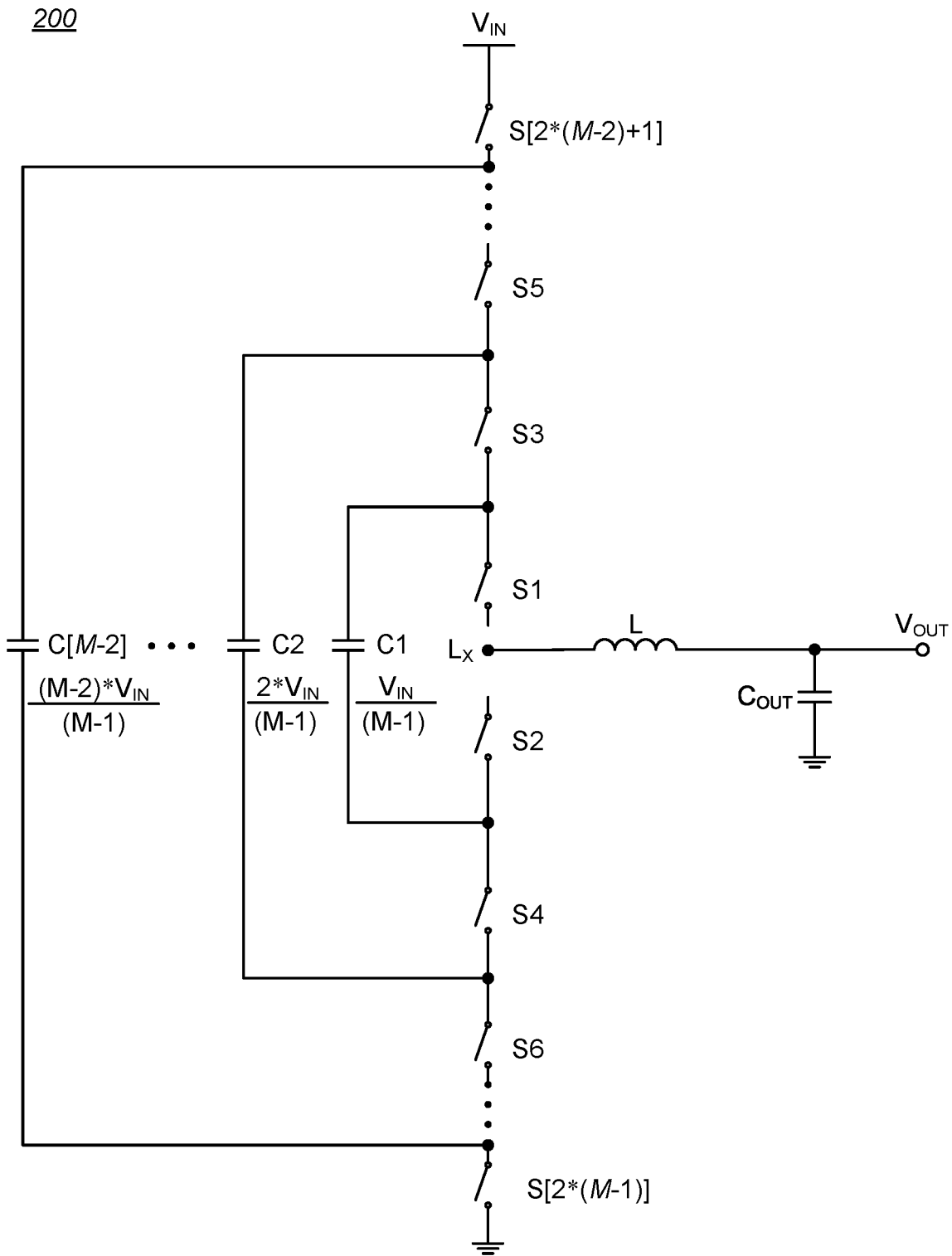
FIG. 2 is schematic diagram of a generalized prior art M-level multi-level converter cell that may be used as the converter cell of FIG. 1.

In some power converter designs, the converter cell 102 may comprise a multi-level converter circuit. For example, FIG. 2 is schematic diagram of a generalized prior art M-level multi-level converter cell 400 that may be used as the converter cell 102 of FIG. 1. A set of power switches, S1-S[2*(M−1)], is series-coupled between $V_{IN}$ and circuit ground, where M≥3. The set of power switches are organized in switch pairs: S1 & S2, S3 & S4, . . . S[2*(M−2)+1] & S[2*(M−1)]. A set of M−2 fly capacitors Cx is coupled in series with certain respective power switches (see FIG. 3), and in parallel with power switches in between those certain power switches. In terms of switch pairs, there are M−1 pairs of power switches, or one more than the number of fly capacitors. Corresponding target average voltages across each fly capacitor Cx in an M-level multi-level converter cell 400 are given by the formula $V_{Cx}=(M-2)*V_{IN}/(M-1)$ [noting that a 2-level converter cell has no capacitors]. Thus, for example, for a 5-level converter cell (M=5), there are 3 fly capacitors C1-C3 and 4 pairs of power switches S1-S8, and the corresponding target average voltages across the 3 fly capacitors C1-C3 are $V_{C1}=\frac{1}{4}V_{IN}$, $V_{C2}=\frac{1}{2}V_{IN}$, and $V_{C3}=\frac{3}{4}V_{IN}$.

An optional inductor L is coupled to an output capacitor $C_{OUT}$ and to a node $L_X$ between power switches S1 and S2. The voltage across the output shunt capacitor $C_{OUT}$ is $V_{OUT}$. The inductor L doubles as a virtual current source that moves all charge between the fly capacitors Cx. This creates a very efficient form of charge transfer, but aggravates the problem of charge-balancing the fly capacitors Cx since current may flow in a positive direction (to $V_{OUT}$) or a negative direction (away from $V_{OUT}$).

Figure 3:
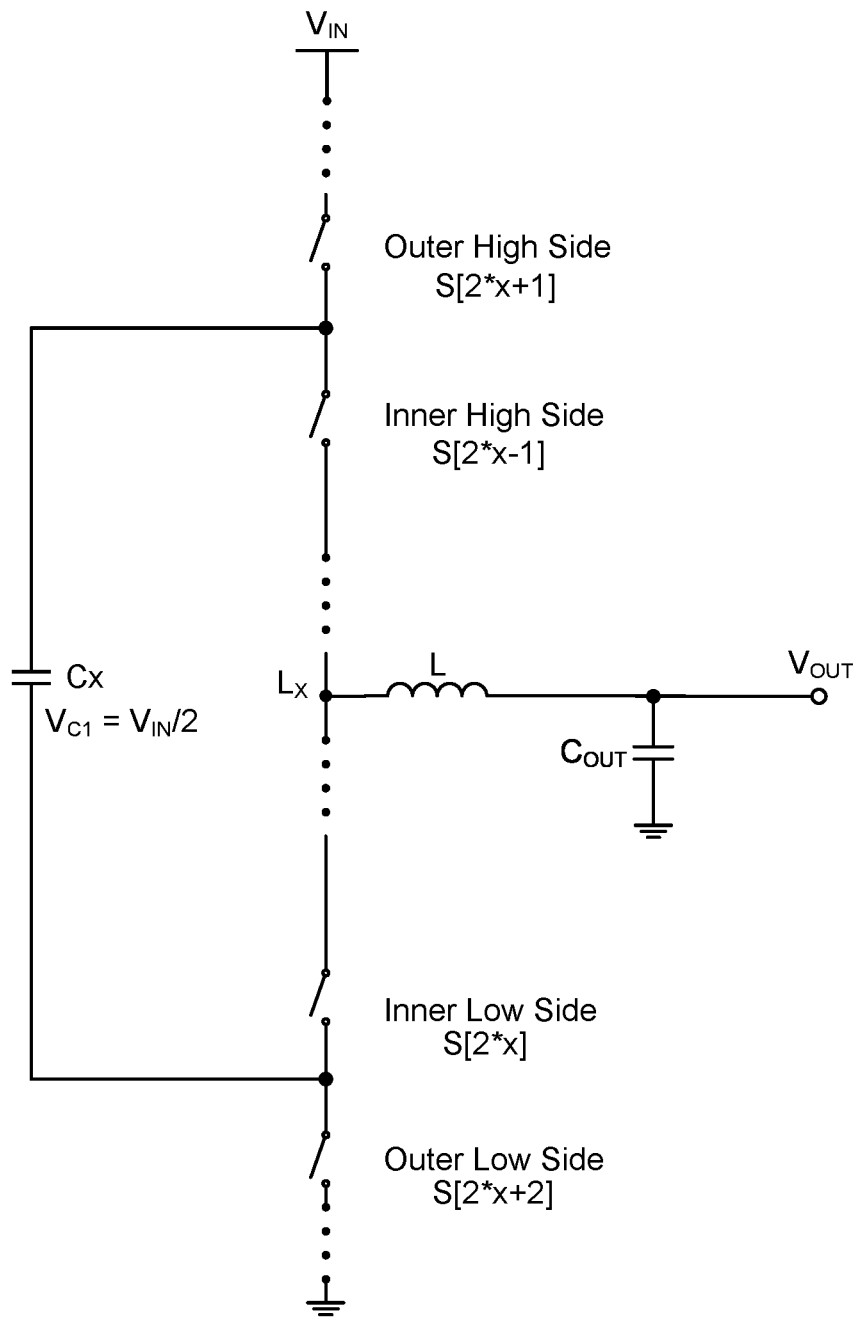
FIG. 3 is schematic diagram of one fly capacitor Cx from FIG. 2 showing corresponding "controlled" power switch sets.

FIG. 3 is schematic diagram 300 of one fly capacitor Cx from FIG. 2 showing corresponding "controlled" power switch sets. Each fly capacitor Cx has a first terminal coupled between an outer high-side power switch S[2*x+1] and an inner high-side power switch S[2*x−1], where "high-side" refers to the $V_{IN}$ side of the converter circuit. Each fly capacitor Cx has a second terminal coupled between an outer low-side power switch S[2*x+2] and an inner low-side power switch S[2*x], where "low-side" refers to the reference potential side of the converter circuit (usually circuit ground GND). Thus, for an M=3 multi-level converter cell 200, a first terminal of the single fly capacitor C1 (i.e., x=1) would be coupled between outer high-side power switch S3 and inner high-side power switch S1, and a second terminal of the capacitor C1 would be coupled between inner low-side power switch S2 and outer low-side power switch S4. Accordingly, each fly capacitor Cx within the multi-level converter cell 200 has four associated power switches that can affect current flow through that fly capacitor Cx, and most of the power switches are shared between adjacent fly capacitors Cx (e.g., switches S3, S5, S4, and S6 in FIG. 2).

The control circuitry for the four associated power switches that can affect current flow through a particular fly capacitor Cx set states for those associated power switches in part as a function of the voltage across the fly capacitor Cx.

The fly capacitor Cx voltages $V_{Cx}$ should be balanced quickly (on a cycle-by-cycle time scale or shorter, where each cycle can be on the order of about 1 s) to get to correct target voltage levels (e.g., $\frac{1}{4}V_{IN}$, $\frac{1}{2}V_{IN}$, etc.). One sign of fly capacitors starting to go out of balance is that the expected interior voltage levels would deviate from target voltage levels more and more over time, which would force the control loop to adjust the duty cycle of the power converter to compensate and introduce sub-harmonic behavior; eventually, if unchecked, the power converter may get out of regulation. One way to digitize the voltage information for the fly capacitors Cx is to use conventional flash ADCs coupled to respective capacitors to convert the voltage across each associated capacitor to a digital signal. A conventional flash ADC (also known as a direct-conversion ADC) uses a linear voltage ladder with a comparator at each "rung" of the ladder to compare an input voltage to successive reference voltages. The output of these comparators is generally fed into a digital encoder, which converts the inputs into a binary value. In order to obtain the capacitor voltages with adequate resolution to achieve a specified voltage balance tolerance, a large number of bits is often needed. For example, for $V_{IN}$=48V, an 8-bit flash ADC would have a resolution of ½ LSB, which is 0.5*48/256=94 mV If a voltage balance is specified to be within 100 mV, an 8-bit ADC is needed, but such an ADC requires 255 comparators and thus suffers from a high cost of integrated circuit (IC) area and power consumption. Using a conventional design approach, a total of three 8-bit flash ADCs would be needed for the three fly capacitors C1, C2, C3 of a 5-level multi-level converter cell, resulting in 768 comparators and even higher IC area and power consumption.

A multi-level converter circuit couples the fly capacitors Cx in different combinations in order to bring the voltage level at the $L_X$ node down or up. As noted above, every time a fly capacitor is used (i.e., not bypassed), the electrical energy flowing through that fly capacitor generally either charges it or discharges it, which creates a control problem: what configurations and in what order can the fly capacitors be switched while maintaining their average voltage?

Resolving the charge-balance problem so as to maintain an average voltage across the single fly capacitor in a 3-level converter circuit is relatively easy (again, 2-level converter circuits lack fly capacitors). For example, in a 3-level converter circuit, there is only one way to generate Level-1 (GND) and Level-3 ($V_{IN}$) voltage levels at the $L_X$ node (see FIG. 2)—the single fly capacitor C1 is not used for these $L_X$ voltage levels. However, for a Level 2 ($\frac{1}{2}V_{IN}$) voltage level at node $L_X$, two separate power switch states can be used: one power switch state charges the capacitor C1 (S3 and S2 closed, S1 and S4 open) and the other power switch state discharges the capacitor (S3 and S2 open, S1 and S4 closed). The control of a 3-level converter circuit is thus fairly easy: every time the power converter cell switches states to Level-2, a controller can alternate between charging and discharging the single capacitor C1 to maintain its voltage. A voltage comparator may be used to monitor the capacitor to help decide on a charging state or a discharging state. For instance, if the capacitor voltage is below $\frac{1}{2}V_{IN}$, then a controller would select charge, and if the capacitor voltage is above $\frac{1}{2}V_{IN}$, then the controller would select discharge.

Higher level converter cells (M≥4) reveal the charge-balance difficulty when more fly capacitors are present. For example, in a 4-level converter cell, a Level-1 voltage level (GND) and a Level-4 voltage level ($V_{IN}$) at the $L_X$ node are each determined by a single switch state. However, the Level-2 voltage level ($\frac{1}{3}V_{IN}$) and Level-3 voltage level ($\frac{2}{3}V_{IN}$) at $L_X$ each can be achieved by any of three different switch states. At even higher orders of a multi-level converter circuit, more switch states are possible for generating the intermediate levels between $V_{IN}$ and GND. Thus, the problem gets much worse with a 5-level converter circuit. A Level-1 voltage level (GND) and a Level-5 voltage level ($V_{IN}$) at the $L_X$ node are each determined by a single switch state. However, the Level-2 voltage level ($\frac{1}{4}V_{IN}$) and Level-4 voltage level ($\frac{3}{4}V_{IN}$) at $L_X$ each can be achieved by any of four different switch states, and the Level-3 voltage level ($\frac{1}{2}V_{IN}$) at $L_X$ each can be achieved by any of six different switch states.

As should be clear from these examples, determining a suitable charge-balance method can become exceedingly difficult as the complexity of a multi-level converter circuit increases. As previously noted, most conventional control methods rely on establishing a sequence of linked state-changes to try to achieve charge balance. Control systems based on long sequences of switch states generally assume that all system variables—such as input voltage and output current—are constant during the sequence. This is unrealistic for a real-world environment, where all system variables tend to be dynamic.

Figure 4:
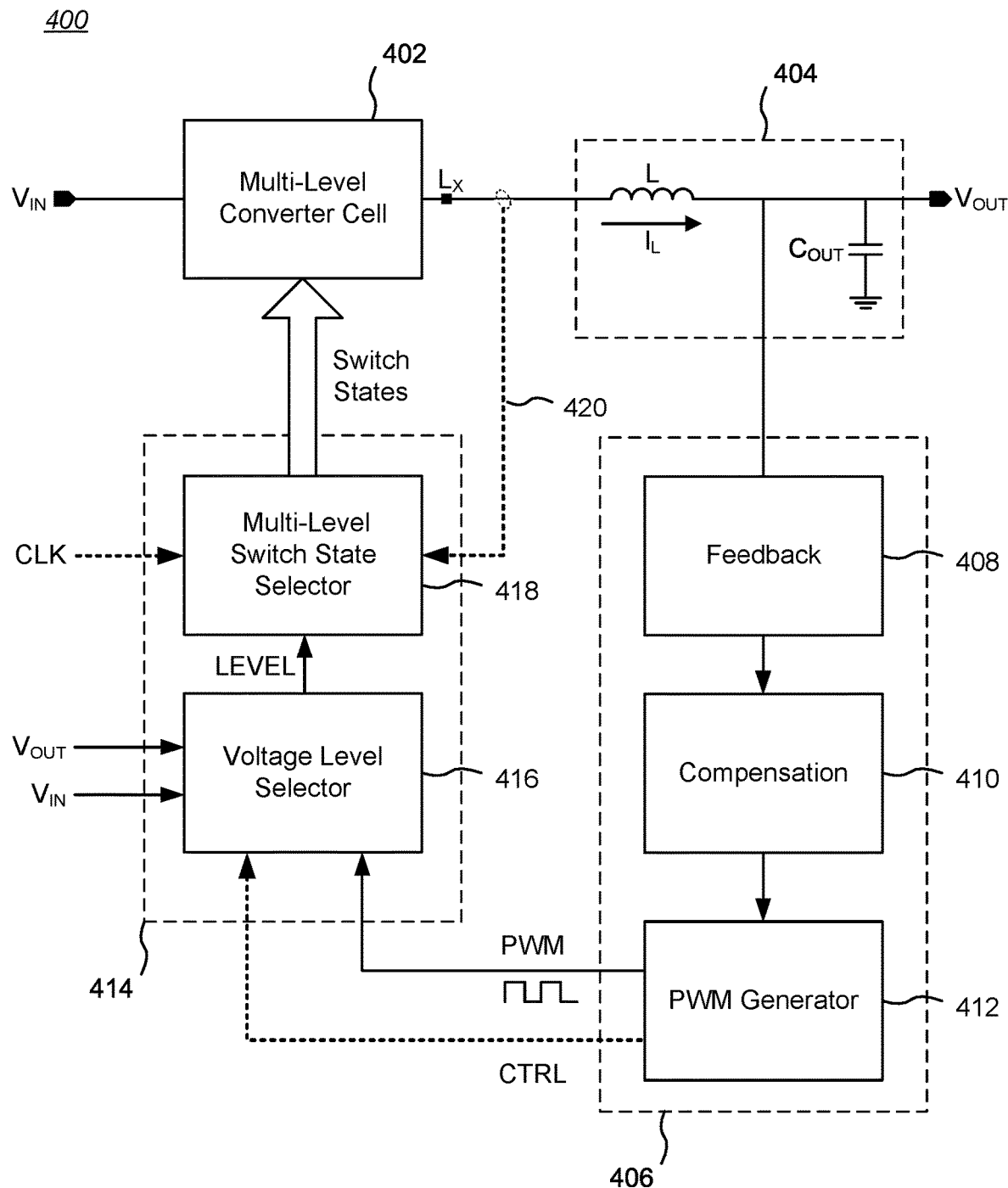
FIG. 4 is a block diagram of one embodiment of control circuitry for an M-level converter cell coupled to an output block comprising an inductor L and an output capacitor $C_{OUT}$.

FIG. 4 is a block diagram of one embodiment of control circuitry 400 for an M-level converter cell 402 coupled to an output block 404 comprising an inductor L and an output capacitor $C_{OUT}$ (conceptually, the inductor L also may be considered as being included within the M-level converter cell 402). This example control circuitry 400 is adapted from the teachings set forth in U.S. patent application Ser. No. 17/560,767, filed Dec. 23, 2021, entitled "Controlling Charge-Balance and Transients in a Multi-Level Power Converter", assigned to the assignee of the present invention, the contents of which are incorporated by reference. However, the present invention may be used in combination with other types of control circuitry for an M-level converter cell 402.

The control circuitry 400 functions as a control loop coupled to the output of the M-level converter cell 402 and to power-switch control inputs of the M-level converter cell 402. In general, the control circuitry 400 is configured to monitor the output (e.g., voltage and/or current) of the M-level converter cell 402 and dynamically generate a set of power-switch control inputs to the M-level converter cell 402 that attempt to stabilize the output voltage and/or current at specified values, taking into account variations of $V_{IN}$ and output load. In alternative embodiments, the control circuitry 400 may be configured to monitor the input of the M-level converter cell 402 (e.g., voltage and/or current) and/or one or more internal nodes of the M-level converter cell 402 (e.g., the voltage across one or more fly capacitors Cx or the current through one or more power switches). Accordingly, most generally, the control circuitry 400 may be configured to monitor the voltage and/or current of a node (e.g., input terminal, internal node, or output terminal) of the M-level converter cell 402. The control circuitry 400 may be incorporated into, or separate from, the overall controller 104 for a power converter 100 embodying the M-level converter cell 402, and portions of the control circuitry 400 may be implemented with a digital micro-controller.

A first block comprises a feedback controller 406, which may be a controller such as a fixed frequency voltage mode or current mode controller, a constant-on-time controller, a hysteretic controller, or any other variant. The feedback controller 406 is shown as being coupled to $V_{OUT}$ from the M-level converter cell 402. In alternative embodiments, the feedback controller 406 may be configured to monitor the input of the M-level converter cell 402 and/or an internal node of the M-level converter cell 402. The feedback controller 406 produces a signal directly or indirectly indicative of the voltage at $V_{OUT}$ that determines in general terms what needs to be done in the M-level converter cell 402 to maintain desired values for $V_{OUT}$: charge, discharge, or tri-state (i.e., open, with no current flow).

In the illustrated example, the feedback controller 406 includes a feedback circuit 408, a compensation circuit 410, and a pulse-width modulation (PWM) generator 412. The feedback circuit 408 may include, for example, a feedback-loop voltage detector which compares $V_{OUT}$ (or an attenuated version of $V_{OUT}$) to a reference voltage which represents a desired $V_{OUT}$ target voltage (which may be dynamic) and outputs a control signal to indicate whether $V_{OUT}$ is above or below the target voltage. The feedback-loop voltage detector may be implemented with a comparison device, such as an operational amplifier (op-amp) or transconductance amplifier (gm amplifier).

The compensation circuit 410 is configured to stabilize the closed-loop response of the feedback controller 406 by avoiding the unintentional creation of positive feedback, which may cause oscillation, and by controlling overshoot and ringing in the step response of the feedback controller 406. The compensation circuit 410 may be implemented in known manner, and may include LC and/or RC circuits.

The PWM generator 412 generates the actual PWM control signal which ultimately sets the duty cycle of the power switches of the M-level converter cell 402. In some embodiments, the PWM generator 412 may pass on additional optional control signals CTRL indicating, for example, the magnitude of the difference between $V_{OUT}$ and the reference voltage (thus indicating that some levels of the M-level converter cell 402 should be bypassed to get to higher or lower levels), and the direction of that difference (e.g., $V_{OUT}$ being greater than or less than the reference voltage). In other embodiments, the optional control signals CTRL can be derived from the output of the compensation circuit 410, or from the output of the feedback circuit 408, or from a separate comparator (not shown) coupled to, for example, $V_{OUT}$. One purpose of the optional control signals CTRL is for advanced control algorithms, when it may be beneficial to know how far away $V_{OUT}$ is from a target output voltage, thus allowing faster charging of the inductor L if the $V_{OUT}$ is severely under regulated.

A second block comprises an M-level controller 414, the primary function of which is to select the power switch states that generate a desired $V_{OUT}$ while maintaining a charge-balance state on the fly capacitors within the M-level converter cell 402 every time an output voltage level is selected, regardless of what power switch state or states were used in the past.

The M-level controller 414 includes a Voltage Level Selector 416 which receives the PWM control signal and the additional control signals CTRL if available. In addition, the Voltage Level Selector 416 may be coupled to $V_{OUT}$ and/or $V_{IN}$. A function of the Voltage Level Selector 416 is to translate the received signals to a target output voltage level (e.g., on a cycle-by-cycle basis). The Voltage Level Selector 416 typically considers at least $V_{OUT}$ and $V_{IN}$ to determine which target level should charge or discharge the output of the M-level converter cell 402 with a desired rate.

The output of the Voltage Level Selector 416 is coupled to an M-level Switch State Selector 418. Taking into account the target level generated by the Voltage Level Selector 416, the M-level Switch State Selector 418 determines which power switch states for the desired output level should be preferred for capacitor charge-balance. The output of the M-level Switch State Selector 418 is coupled to the power switches of the M-level converter cell 402 (through appropriate level-shifter circuits and drivers circuits, as may be needed for a particular converter cell) and includes the power switch state settings determined by the M-level Switch State Selector 418 (which selects the configuration of power switches within the M-level converter cell 402 corresponding to a selected target level).

In general (but not always), the Voltage Level Selector 416 and the M-level Switch State Selector 418 only change their states when the PWM signal changes. For example, when the PWM signal goes high, the Voltage Level Selector 416 selects which level results in charging of the inductor L and the M-level Switch State Selector 418 sets which version of switch settings to use for that level. Then when the PWM signal goes low, the Voltage Level Selector 416 selects which level should discharge the inductor L and the M-level Switch State Selector 418 sets which version of that level to use. Thus, the Voltage Level Selector 416 and the M-level Switch State Selector 418 generally only change states when the PWM signal changes (the PWM signal is in effect their clock signal). However, there may be situations or events where it is desirable for the CTRL signals to change the state of the Voltage Level Selector 416. In some embodiments, it may be useful to include a timing function that forces the M-level Switch State Selector 418 to re-evaluate the optimal version of the power switch state periodically, for example, in order to avoid being "stuck" at one level for a very long time, potentially causing charge imbalances. Another case is when the inductor current changes polarity—at that instant, the M-level Switch State Selector 418 may change the switch state to continue to charge or discharge the fly capacitors correctly.

In embodiments that utilize the teachings set forth in the patent application entitled "Controlling Charge-Balance and Transients in a Multi-Level Power Converter" referenced above, the M-level controller 414 implements a control method for the M-level converter cell 402 that selects an essentially optimal power switch state which moves the fly capacitors Cx towards a charge-balance state every time a voltage level at the $L_X$ node is selected, regardless of what power switch state or states were used in the past. Accordingly, such multi-level converter circuits are free to select a different power switch state or $L_X$ voltage level every switching cycle without a need to keep track of any prior power switch state or sequence of power switch states.

In some embodiments, the M-level Switch State Selector 418 may take into account the magnitude and/or polarity of current $I_L$ flowing through the inductor L by way of an optional current-measurement input 420, which may be implemented in conventional fashion.

One notable benefit of the control circuitry shown in FIG. 4 is that it enables generation of voltages in boundary zones between voltage levels, which represent unattainable output voltages for conventional multi-level DC-to-DC converter circuits where switching is confined to two adjacent voltage levels.

While FIG. 4 shows a particular embodiment of control circuitry for an M-level converter cell as modified in accordance with the present invention, it should be appreciated that other control circuits may be adapted or devised to provide suitable switching signals for the power switches within a converter cell while still being able to use embodiments of the present invention.

Figure 5A:
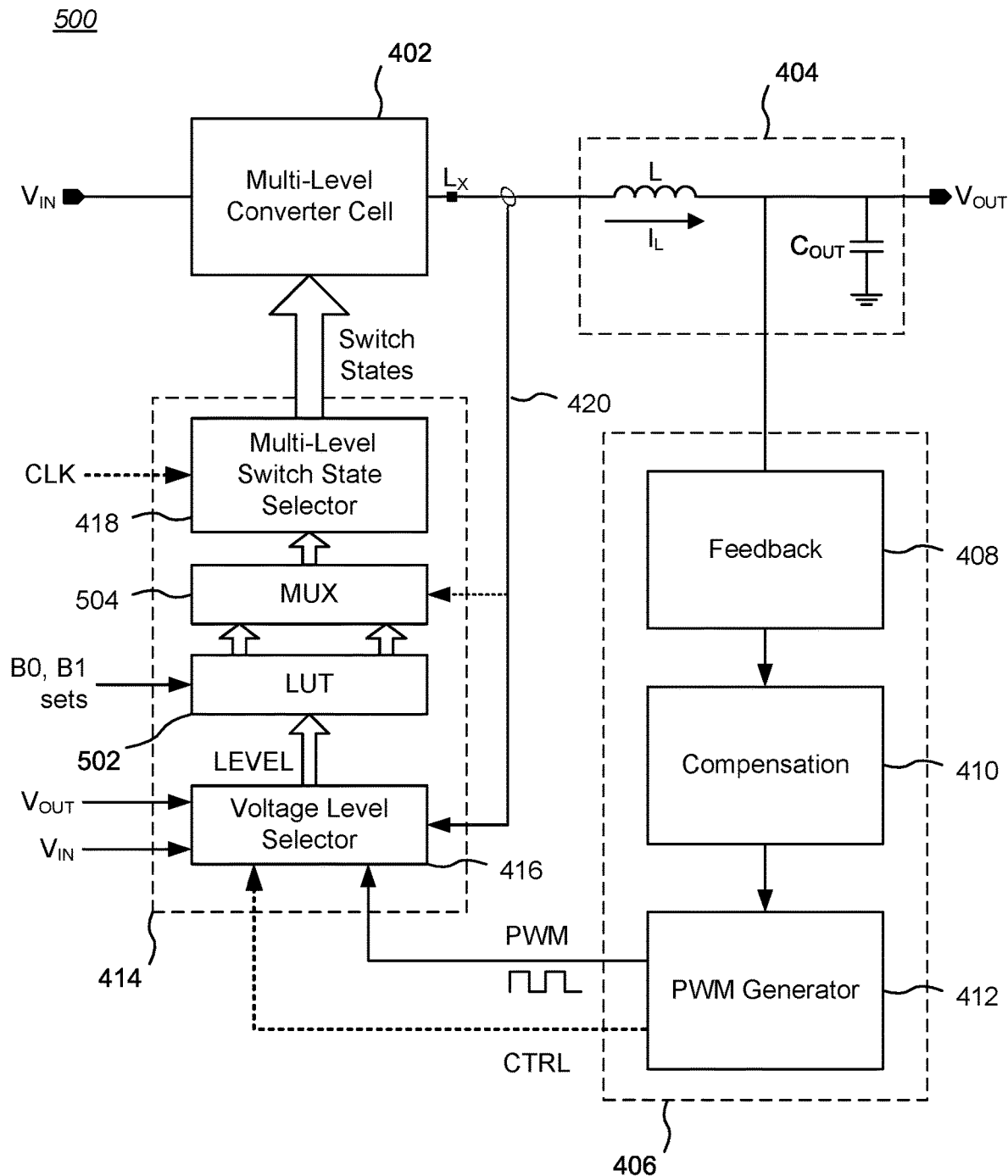
FIG. 5A is a block diagram of a first embodiment of an improved controller circuit for an M-level converter cell in accordance with the present invention.

FIG. 5A is a block diagram of a first embodiment of an improved controller circuit 500 for an M-level converter cell 402 in accordance with the present invention. Similar in most aspects to the control circuitry 400 of FIG. 4, the improved controller circuit 500 includes a look-up-table (LUT) 502 and a multiplexer (MUX) 504 coupled in series between the Voltage Level Selector 416 and the M-level Switch State Selector 418. The Voltage Level Selector 416 provides a LEVEL signal that includes a portion of an address within the LUT 502. An additional portion of an address within the LUT 502 is provided by multiples sets of two bits, B0 and B1, from multiple 2-bit fast flash ADCs, described in detail below. In the illustrated example, the LUT 502 outputs 8 bits of data per address, which is coupled to the MUX 504 as two 4-bit switch-state selector values corresponding respectively to positive inductor current $+I_L$ and negative inductor current $-I_L$. The MUX 504 selects one of the two switch-state selector values and the M-level Switch State Selector 418 converts the selected-switch state selector values to corresponding switch states that are applied to the power switches within the M-level converter cell 402. In the illustrated example, the current-measurement input 420 provides polarity information to the Voltage Level Selector 416 for the current $I_L$ flowing through the inductor L. In alternative embodiments, the current polarity represented by the current-measurement input 420 may be used to directly select the output of the MUX 504 so as to select a switch state applicable to the corresponding current polarity of the inductor L.

FIG. 5B is a table showing the effect of switch-state selector values on the power switches of an example 5-level converter cell when the inductor L current is positive. The 4-bit patterns (e.g., "0000", "1111") indicate switch positions for the upper four switches (S1, S3, S5, S7—see FIG. 2) of the 5-level converter cell; the lower four switches (S2, S4, S6, S8—see FIG. 2) of the 5-level converter cell would receive complementary 4-bit switch position patterns generated within the M-level Switch State Selector 418. The values in the table of FIG. 5B represent the result on the 3 fly capacitors C1, C2, C3 due to each set of switch positions: a value of "−1" indicates that a fly capacitor is being discharged, a value of "0" indicates no change in charge of a fly capacitor, and a value of "1" indicates that a fly capacitor is being charged. Of note, when Level 1 or Level 5 is selected, no fly capacitor is involved and hence no change in charge occurs due to switch positions. Further, Levels 2, 3, and 4 provide multiple ways achieving a desired target voltage but with different charge/discharge effects on the fly capacitors C1-C3, and complex interdependencies exist. For example, in Level 2, there is no way to discharge fly capacitor C3 without also charging fly capacitor C2 (switch-state selector pattern "0100"), so if fly capacitor C2 is overcharged as a result, then in a subsequent cycle, discharge fly capacitor C2 should be discharged to achieve balance.

FIG. 5C is a table showing the effect of switch-state selector values on the power switches of an example 5-level converter cell when the inductor L current is negative. The table structure is the same as for FIG. 5B, but all table values are inverted (i.e., a "1" in FIG. 5B becomes a "−1" in FIG. 5C, and a "−1" in FIG. 5B becomes a "1" in FIG. 5C).

The LUT 502 is accessed by a 9-bit address. The 3 MSBs of the 9-bit address are provided by the Voltage Level Selector 416, and may be regarded as a "page" address indicating a selected level (L1-L5) determined to be needed to provide the regulated output $V_{OUT}$. Note that while 3 bits could address up to 8 pages, in the illustrated example, only 5 pages are used, and in some applications as few as 3 pages may be used.

In the illustrated example, the 6 LSBs of the 9-bit address are provided by three 2-bit fast flash ADCs each outputting a B0, B1 pair of binary values as described in detail below. The B0 value indicates whether the voltage on an associated fly capacitor is below a reference target level (B0=0) and thus the fly capacitor should be charged, or above the reference target level (B0=1) and thus the fly capacitor should be discharged. The B1 value indicates whether the voltage on an associated fly capacitor is within a target window (B1=0) or outside of the target window (B1=1). Note that in some embodiments, the fast flash ADCs may output more than 2 bits for increased precision (finer granularity).

The LUT 502 in the example circuit shown in FIG. 5A contains a set of up to 64 switch-state selector values in 5 pages (320 values total) of data cells, each data cell comprising 8 bits (4 bits for positive inductor current values and 4 bits for negative inductor current values). The 8-bit data cells of the LUT 502 are addressed by a 9-bit address resulting from the concatenation of the 3 MSBs provided by the Voltage Level Selector 416 and the 6 LSBs provided by the three 2-bit fast flash ADCs. TABLE 1 is an example of one set of switch-state selector values that may be stored as addressable data values within the LUT 502. To save space in this disclosure, only the 4 bits of switch-state selector values for positive inductor current $+I_L$ are shown, thus omitting the 4 bits of switch-state selector values for negative inductor current $-I_L$; however, when concatenated together, the two sets of 4 bits form an 8-bit data output from the LUT 502. Further, to save space in this disclosure, only 16 sets (80 8-bit values total) are shown rather than a full range of 64 sets (320 8-bit values total).

TABLE 1

| ROW # | ADC3 | | ADC2 | | ADC1 | | L1 | L2 | L3 | L4 | L5 |
|---|---|---|---|---|---|---|---|---|---|---|---|
| | B1 | B0 | B1 | B0 | B1 | B0 | 000 | 001 | 010 | 011 | 100 |
| 0 | 0 | 0 | 0 | 0 | 0 | 0 | 0000 | 1000 | 1100 | 1110 | 1111 |
| 1 | 0 | 0 | 0 | 0 | 0 | 1 | 0000 | 1000 | 1001 | 1101 | 1111 |
| 2 | 0 | 0 | 0 | 0 | 1 | 0 | 0000 | 0010 | 0110 | 1110 | 1111 |
| 3 | 0 | 0 | 0 | 0 | 1 | 1 | 0000 | 0001 | 1001 | 1101 | 1111 |
| 4 | 0 | 0 | 0 | 1 | 0 | 0 | 0000 | 0010 | 0011 | 1011 | 1111 |
| 5 | 0 | 0 | 0 | 1 | 0 | 1 | 0000 | 1000 | 1001 | 1011 | 1111 |
| 6 | 0 | 0 | 0 | 1 | 1 | 0 | 0000 | 0010 | 1010 | 1110 | 1111 |
| 7 | 0 | 0 | 0 | 1 | 1 | 1 | 0000 | 0001 | 1001 | 1101 | 1111 |
| 8 | 0 | 0 | 1 | 0 | 0 | 0 | 0000 | 0100 | 1100 | 1101 | 1111 |
| 9 | 0 | 0 | 1 | 0 | 0 | 1 | 0000 | 0100 | 1100 | 1101 | 1111 |
| 10 | 0 | 0 | 1 | 0 | 1 | 0 | 0000 | 0100 | 1100 | 1110 | 1111 |
| 11 | 0 | 0 | 1 | 0 | 1 | 1 | 0000 | 0001 | 1001 | 1101 | 1111 |
| 12 | 0 | 0 | 1 | 1 | 0 | 0 | 0000 | 0010 | 0011 | 1011 | 1111 |
| 13 | 0 | 0 | 1 | 1 | 0 | 1 | 0000 | 0010 | 0011 | 1011 | 1111 |
| 14 | 0 | 0 | 1 | 1 | 1 | 0 | 0000 | 0010 | 1010 | 1011 | 1111 |
| 15 | 0 | 0 | 1 | 1 | 1 | 1 | 0000 | 0001 | 1001 | 1011 | 1111 |

The level (L1-L5) is selected by algorithm such as described in U.S. patent application Ser. No. 17/560,767, reference above, taking into account the polarity of current $I_L$ flowing through the inductor L. Looking at row #0, the 6 LSBs (3 sets of B0, B1 pairs) of the 9-bit LUT address generated by the 2-bit fast flash ADCs (ADC1-ADC3) associated with fly capacitors C1-C3 indicate that all 3 fly capacitors have voltages respective $V_{C1}$-$V_{C3}$ within their respective windows (B1's=0) but below their respective target voltages (B0's=0). In selecting the 3 MSBs of the 9-bit LUT address, the Voltage Level Selector 416 may be configured to preferably select any level that does not cause discharging (since all fly capacitors Cx are below their respective target voltages). For example, if L2 is the selected level of operation for the converter cell 402, then the Voltage Level Selector 416 may output "001", which in conjunction with the 6 LSBs of "000000", addresses a LUT 502 cell containing the positive current switch-state selector value of "1000" (see row #0 of TABLE 1). That value, along with the negative current counterpart value, would be output to the MUX 504, which would select one value to pass on to the M-level Switch State Selector 418. As the table in FIG. 5B shows, a positive current switch-state selector value of "1000" causes fly capacitor C3 to be charged with no changes to fly capacitors C1 and C2.

If, instead, L3 is the selected level of operation for the converter cell 402, then the Voltage Level Selector 416 may output "010", which in conjunction with the 6 LSBs of "000000", results in the LUT 502 outputting a positive current switch-state selector value of "1100", which causes fly capacitor C2 to be charged with no changes to fly capacitors C1 and C3.

Row #1 is a case where the ADCs indicate that $V_{C2}$ and $V_{C3}$ are within their respective window and below their respective target voltages, while $V_{C1}$ is within its window and above its respective target voltage (LSBs="000001"). Row #2 is a case where the ADCs indicate that $V_{C2}$ and $V_{C3}$ are within their respective window and below their respective target voltages, while $V_{C1}$ is outside its window and below its respective target voltage (LSBs="000010"). Row #3 is a case where the ADCs indicate that $V_{C2}$ and $V_{C3}$ are within their respective window and below their respective target voltages, while $V_{C1}$ is outside its window and above its respective target voltage (LSBs="000011").

The selecting switch-state selector values inside the LUT 502 may be pre-determined and loaded in before the start of operation. Selecting switch-state selector values to store in the LUT 502 may be done heuristically, taking into account the M size (e.g., 4-level, 5-level) of the multi-level converter and the voltages and capacitances of the corresponding fly capacitors. In general, switch-state selector values may be weighted towards balancing the highest voltage fly capacitors first, because derating causes their actual capacitance to be relatively small compared to lower voltage fly capacitors.

As should be appreciated, the size of the LUT would need to be larger to accommodate all of the possible switch-state selector values for converter cells larger than a 5-level converter cell (e.g., a 6-level or 7-level converter cell). Each additional fly capacitor would need an associated 2-bit fast flash ADC, each ADC adding two bits to the address to the LUT 502.

Figure 5D:
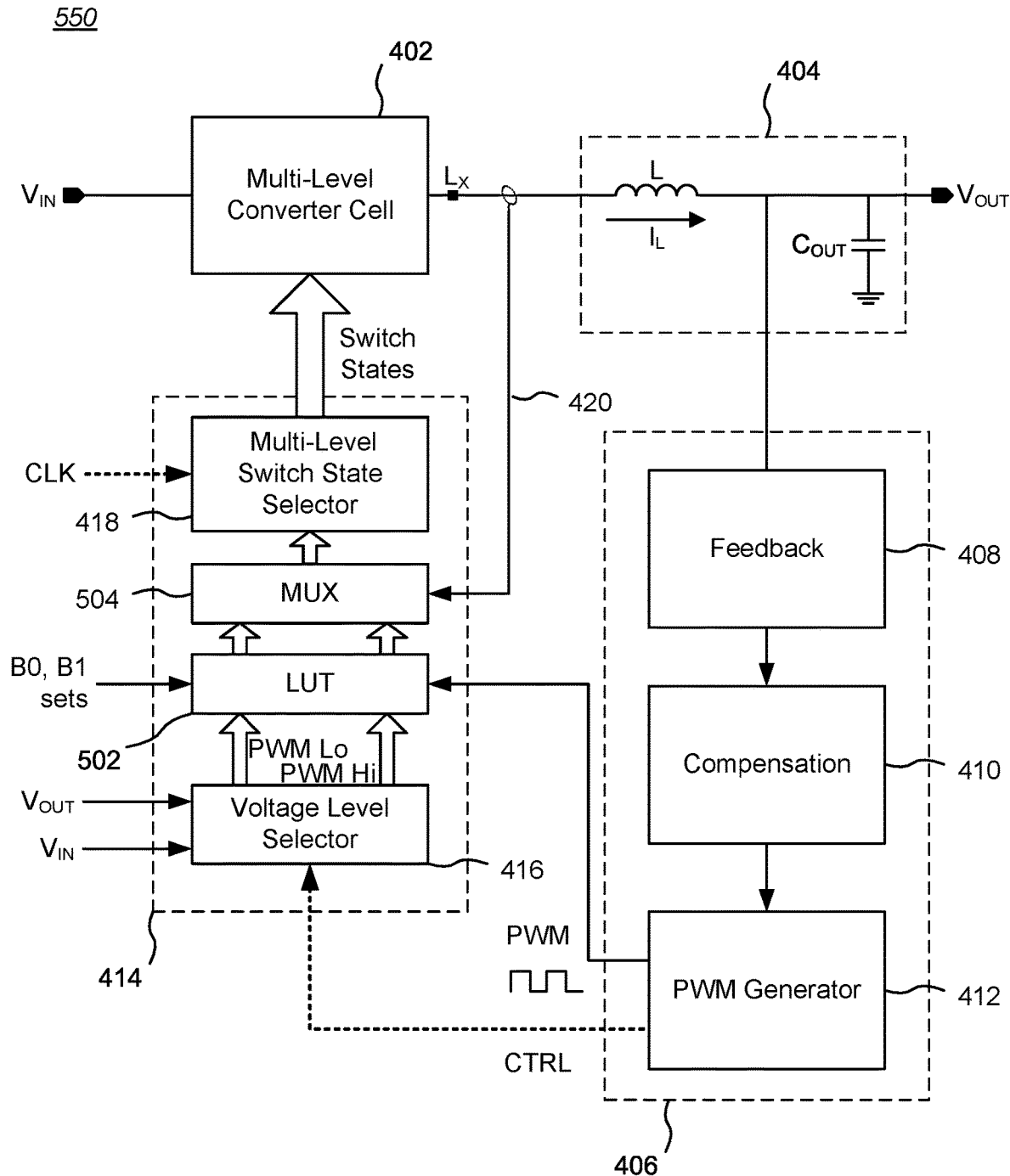
FIG. 5D is a block diagram of a second embodiment of an improved controller circuit for an M-level converter cell in accordance with the present invention.

FIG. 5D is a block diagram of a second embodiment of an improved controller circuit 550 for an M-level converter cell 402 in accordance with the present invention. Similar in most aspects to the control circuitry 500 of FIG. 5A, one key difference is that the PWM signal from the PWM generator 412 is applied to the LUT 502 rather than to the Voltage Level Selector 416. Accordingly, the Voltage Level Selector 416 may be clocked at a slower rate, but must output two signals, PWM high and PWM low, to the LUT 502. In the illustrated example, the current-measurement input 420 provides polarity information to directly select the output of the MUX 504 so as to select a switch state applicable to the corresponding current polarity of the inductor L.

Figure 5E:
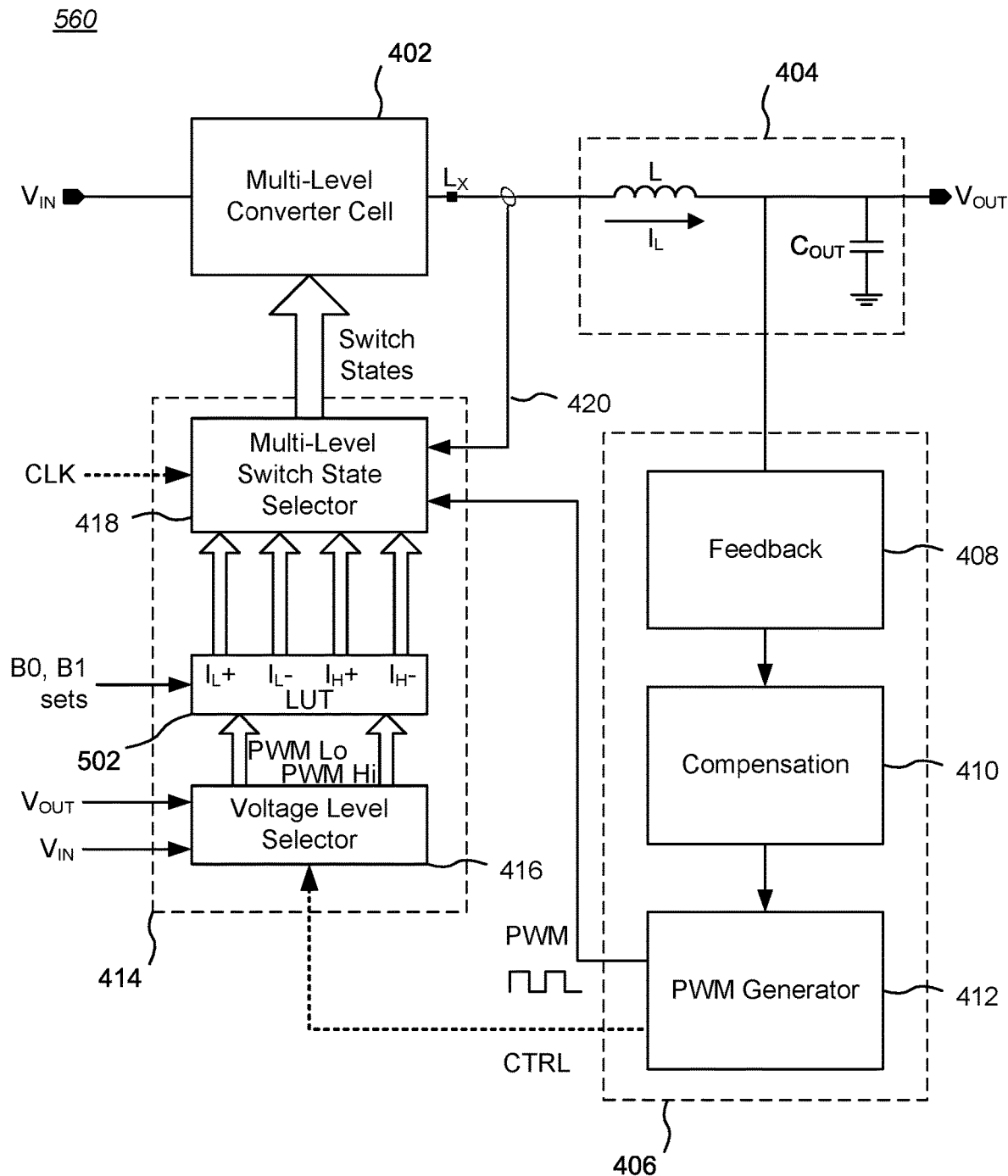
FIG. 5E is a block diagram of a third embodiment of an improved controller circuit for an M-level converter cell in accordance with the present invention

FIG. 5E is a block diagram of a third embodiment of an improved controller circuit 560 for an M-level converter cell 402 in accordance with the present invention. Similar in most aspects to the control circuitry 500 of FIG. 5A, one key difference is that the PWM signal from the PWM generator 412 is applied to the M-level Switch State Selector 418 rather than to the Voltage Level Selector 416. In the illustrated example, the current-measurement input 420 provides polarity information to directly select the output of the M-level Switch State Selector 418 so as to select a switch state applicable to the corresponding current polarity of the inductor L. Accordingly, the LUT 502 may output four signals corresponding to low (discharge) current with positive polarity ($I_L$+), low current with negative polarity ($I_L$-), high (charge) current with positive polarity ($I_H$+), and high current with negative polarity ($I_H$-). The outputs from the LUT 502 may be applied directly to the M-level Switch State Selector 418 with selection made by the PWM signal and the current-measurement input 420.

Note that if the PWM signal is applied to the multi-level switch state selector 418, then the system can react to the charge state of the fly capacitors at every PWM edge. If the PWM signal is not applied at those stages and the LUT 502 is controlled by a slower clock, then the fly capacitors cannot change as fast and accordingly should be sized larger for the same ripple voltage. Looked at a different way, using the PWM signal at the voltage level selector 416 or at the LUT 502 rather than at the multi-level switch state selector 418 has a greater chance of allowing a voltage deviation on the fly capacitors due to signal propagation delays (hence the need for large fly capacitors). It is desirable to have the shortest propagation delay from the PWM generator 412 to the $L_X$ node to select the correct level; longer delays may increase the error and may result in selection of the wrong level. Accordingly, applying the PWM signal to the multi-level switch state selector 418 generally results in the shortest propagation delay and generally allows use of smaller fly capacitors.

Figure 6:
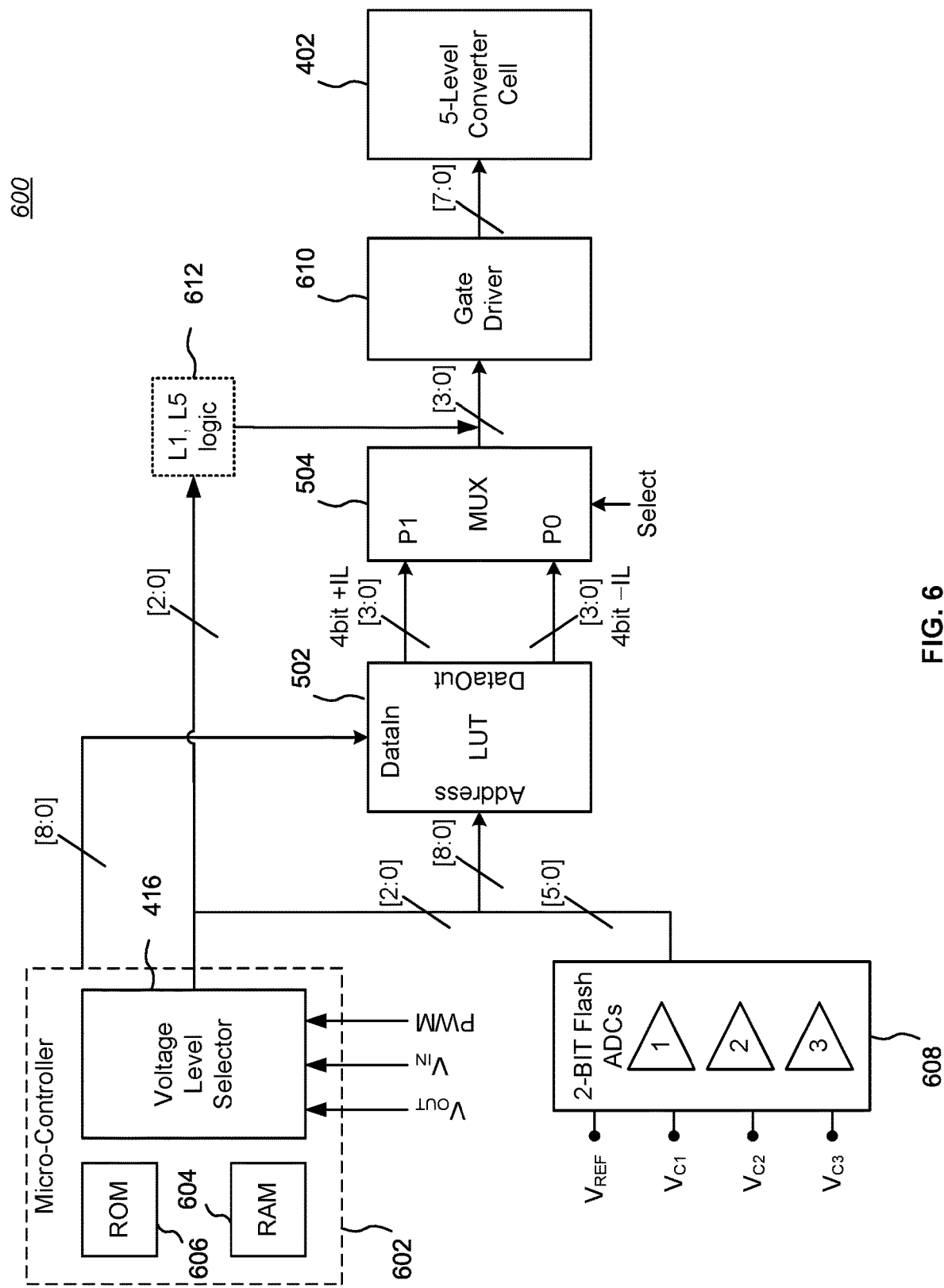
FIG. 6 is a block diagram of details of a 5-level another version of an improved controller.

FIG. 6 is a block diagram of details of a 5-level another version of an improved controller 600. The improved controller 600 may be regarded as a variant of any of the controller circuits of FIG. 5A, 5D, or 5E. The Voltage Level Selector 416 may be implemented as part of a microcontroller 602, which may include RAM 604 and/or ROM 606 (which may be a reprogrammable type of ROM). As described above, the Voltage Level Selector 416 outputs the 3 MSBs [2:0] of the 9-bit address [8:0] to the LUT 502. A block 608 of three 2-bit fast flash ADCs provide the 6 LSBs [5:0] of the 9-bit address to the LUT 502. The LUT 505 provides two 4-bit switch-state selector values (corresponding respectively to positive inductor current $+I_L$ and negative inductor current $-I_L$) to the MUX 504, which selects one set of 4-bit switch-state selector values to be passed to a gate driver circuit 610. The gate driver 610 is coupled a converter cell 402 (which in this example is a 5-level converter cell) and passes on the output from the MUX 504, as well as a complemented version of that output, which are applied to the power switches within the converter cell 402. For example, if the MUX 504 outputs binary 0010, the gate driver 610 will output both binary 0010 and binary 1101.

In some embodiments, a current polarity measurement may be used to directly select the output of the MUX 504 so as to select a switch state applicable to the corresponding current polarity of the inductor L. The micro-controller 602 may also be coupled to a DataIn port of the LUT 502, in order to allow initial programming and reprogramming of the data cells within the LUT 502.

Use of the LUT 502 supports operations that require a response time faster than a PWM cycle of the PWM generator 412 (see FIG. 5A), especially since within a PWM cycle, the inductor current polarity can change at least twice, and flying capacitor voltages detected by the dedicated 2-bit fast flash ADCs can change asynchronously and continuously at any moment. Intra-cycle changes in the above two values may update the address presented to the LUT 502, which can change the output of switch-state selector values (after a brief LUT memory access time delay) in order to re-configure the state of the power switches.

As noted above with respect to FIGS. 5D and 5E, in some embodiments, generation of a PWM signal may occur at different points than depicted in FIG. 5A. For example, moving generation of the PWM signal to after the Voltage Level Selector 416 means that the voltage selector 416 can be a slower component (but must put out two outputs, PWM_high and PWM_low). Similarly, generation of the PWM signal may be moved to the MUX 504, in which case the LUT 502 would provide four outputs—PWM_high+ for positive current, PWM_high− for negative current, PWM_low+ for positive current, and PWM_low− for negative current. Such a configuration can relax how fast the LUT 502 needs to perform.

Implementing the Voltage Level Selector 416 as part of a micro-controller 602 enables a number of other useful functions that do not require cycle-to-cycle update speed, such as determining the 3-bit MSB output to the LUT 502, using $V_{IN}$ and $V_{OUT}$ voltages to determine the optimal levels L1-L5 to select; fault response (for example, for time-out, over-temperature, over-voltage, and/or over-current faults); and selectively updating (reprogramming) the switch-state selector values stored in the LUT 502 based on dynamic conditions.

Referring back to TABLE 1 above, the switch-state selector values for L1 are always "0000" for the positive inductor current case (same for the negative inductor current case), and for L5 are always "1111" for the positive inductor current case (same for the negative inductor current case). Consequently, in alternative embodiments, the size of the LUT 502 may be reduced from 5 pages of 64 rows (320 8-bit values total) to 3 pages of 64 rows (192 8-bit values total) by adding additional "L1, L5" logic 612 to intercept all "000" and "100" MSB outputs from the Voltage Level Selector 416 and provide a respective 4-bit value of "0000" or "1111" to the M-level Switch State Selector 418.

Advantages of the using a look-up table as disclosed above include:

- being able to provide fast switch state updates for the converter cell power switches based on real-time flying capacitor voltage measurements to balance the fly capacitor voltages at a cycle-by-cycle rate or even faster (intra-cycle);
- flexibility to adjust the voltage balance algorithm as needed by reprogramming the LUT 502 to customize switch-state selector values to actual fly capacitor characteristics; for example, the voltage change of certain fly capacitors may be faster than the voltage change of other fly capacitors, and such fast-changing fly capacitors may need a higher priority to balance their voltages;
- the look-up table data may also be updated by the microcontroller during operation when the update is not required to be fast or when the memory locations are not actively used. One example would be that when $V_{OUT}$ is at a low voltage operating between level 1 and level 2, other high levels (pages) such as level 3 can be updated without interrupting the operation as long as a dual port memory is used.

In considering the characteristics of a multi-level converter and the control algorithms needed to balance fly capacitor voltage(s) to specific targets, the inventor realized that a full 8-bit, 255 comparator ADC was not required for indicating fly capacitor voltages. In a 3-level converter having a single fly capacitor, the balancing algorithm uses one bit of information indicating either that the fly capacitor voltage is too high or too low from a specified target voltage. However, for higher level multi-level converters with multiple capacitors (e.g., a 4-level power converter having 3 fly capacitors), an additional bit of voltage range/window information is needed so that a priority can be determined of which fly capacitor to balance first. Accordingly, an aspect of the present invention is a 2-bit fast flash ADC circuit designed for use with multi-level converters to achieve all the following: high conversion speed, high resolution, small layout area, low power, and the ability to meet the requirements for properly balancing fly capacitor voltages in a multi-level converter cell.

Figure 7:
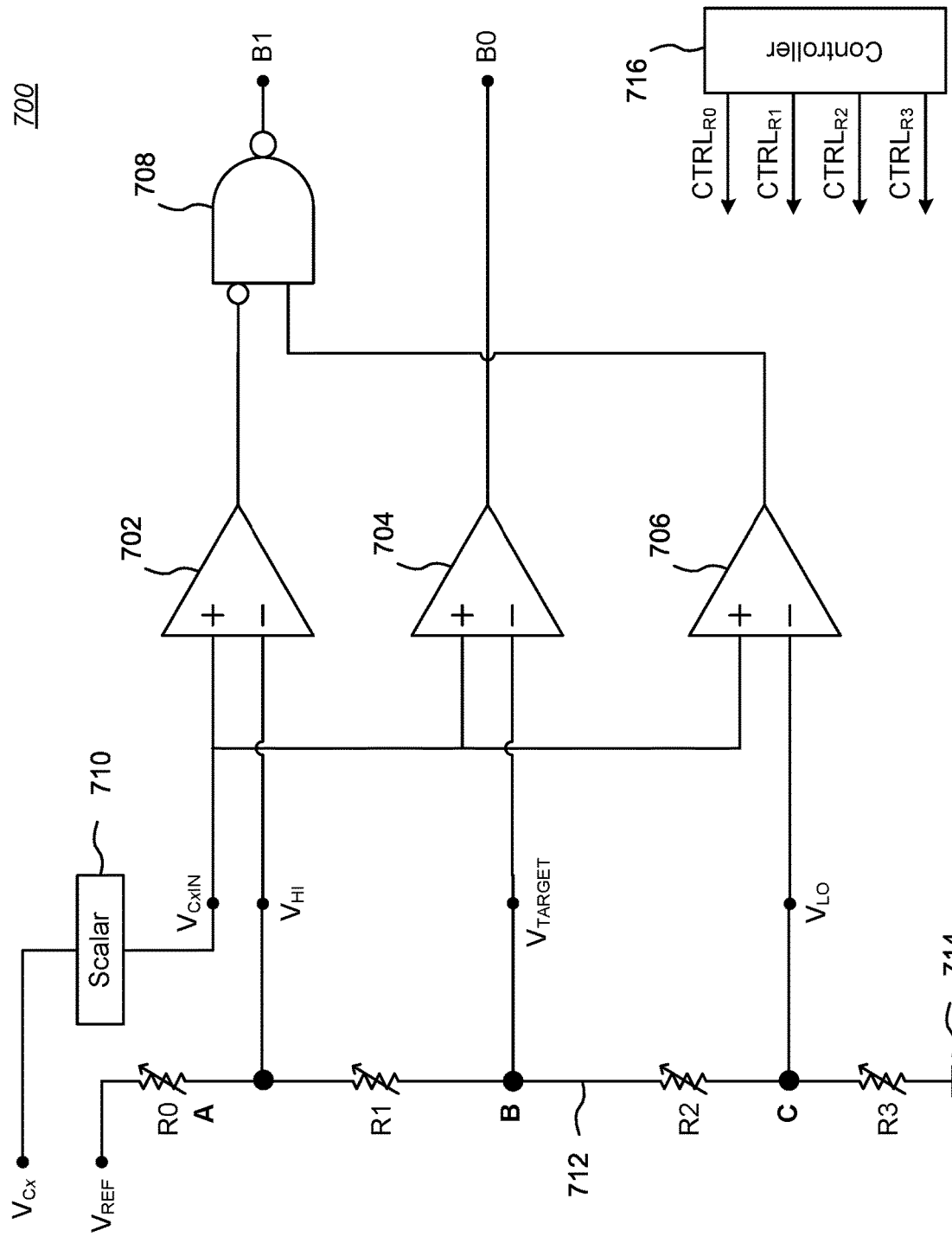
FIG. 7 is a schematic diagram of an embodiment of a 2-bit fast flash ADC circuit that is particularly suited for use in conjunction with the circuit of FIG. 6.

FIG. 7 is a schematic diagram of an embodiment of a 2-bit fast flash ADC circuit 700 that is particularly suited for use in conjunction with the circuit of FIG. 6. An instance of the 2-bit fast flash ADC circuit 700 may be coupled across a corresponding fly capacitor Cx in a multi-level converter cell.

In the illustrated example, a voltage $V_{CxIN}$ representing the voltage $V_{Cx}$ across the plates of a fly capacitor Cx is applied to a first terminal of a first comparator 702, to a first terminal of a second comparator 704, and to a first terminal of a third comparator 706. The voltage $V_{CxIN}$ may equal $V_{Cx}$ or may be a scaled version of $V_{Cx}$ to accommodate the input range of the comparators 702, 704, 706.

A second input of the first comparator 702 is coupled to a specified upper window voltage threshold $V_{HI}$, which may be a scaled version of a general reference voltage $V_{REF}$ (e.g., 2.4V). Similarly, a second input of the third comparator 706 is coupled to a specified lower window voltage threshold $V_{LO}$, which may be a scaled version of the general reference voltage $V_{REF}$. A reference voltage $V_{TARGET}$ is coupled to a second input of the second comparator 704 and may be a scaled version of the general reference voltage $V_{REF}$. The 2-bit fast flash ADC circuit 700 thus uses only 3 comparators, resulting in a much smaller layout area than a conventional 8-bit ADC. The output of the second comparator 704 is a first bit B0.

In all cases, manipulating a voltage to obtain a scaled voltage may be accomplished by a number of known circuits, including a resistive divider.

In the illustrated example, the output of the first comparator 702 is coupled to an inverting input of NAND gate 708, while the output of the third comparator 706 is coupled to a non-inverting input of NAND gate 708. The output of the output of the NAND gate 708 is a second bit B1. As should be appreciated, different combinations of logic elements may be used to implement the functions of the NAND gate 708. The combination of the first comparator 702, the third comparator 706, and the NAND gate 708 may thus be regarded as a circuit that provides a second binary output B1 indicating whether the input voltage $V_{Cx}IN$ is inside or outside a voltage window defined by the reference voltage input $V_{HI}$ and the reference voltage input $V_{LO}$.

The first bit B0 indicates whether the voltage $V_{Cx}$ (represented by $V_{CxIN}$) of a particular capacitor Cx is above or below a corresponding target voltage (e.g., $\frac{1}{4}V_{IN}$, $\frac{1}{2}V_{IN}$, etc.)—for example, B0=0 may be taken to indicate that the voltage $V_{Cx}$ is below the target voltage for corresponding capacitor Cx, while B0=1 may be taken to indicate that the voltage $V_{Cx}$ is above the target voltage for corresponding capacitor Cx.

The second bit B1 indicates whether the voltage $V_{Cx}$ (represented by $V_{CxIN}$) of a particular capacitor Cx is inside or outside a pre-determined target window, which is a range of voltages around the target voltage for that capacitor Cx (see also FIG. 4). For example, B1=0 may be taken to indicate that the voltage $V_{Cx}$ is inside a specified window (voltage range) for corresponding capacitor Cx, while B1=1 may be taken to indicate that the voltage $V_{Cx}$ is outside a specified window for corresponding capacitor Cx. The B1 bit thus provides additional bit of voltage range/window information needed so that a priority can be determined as to which fly capacitor Cx to balance first.

Once the B1, B0 bit pair is generated for each fly capacitor Cx, that information may be provided to a control system for an M-level converter cell 402, such as the improved controller circuit of FIG. 6, in order to balance charge across the fly capacitors Cx by selecting switch states for the set of associated power switches, S1-S[2*(M−1)].

Figure 8:
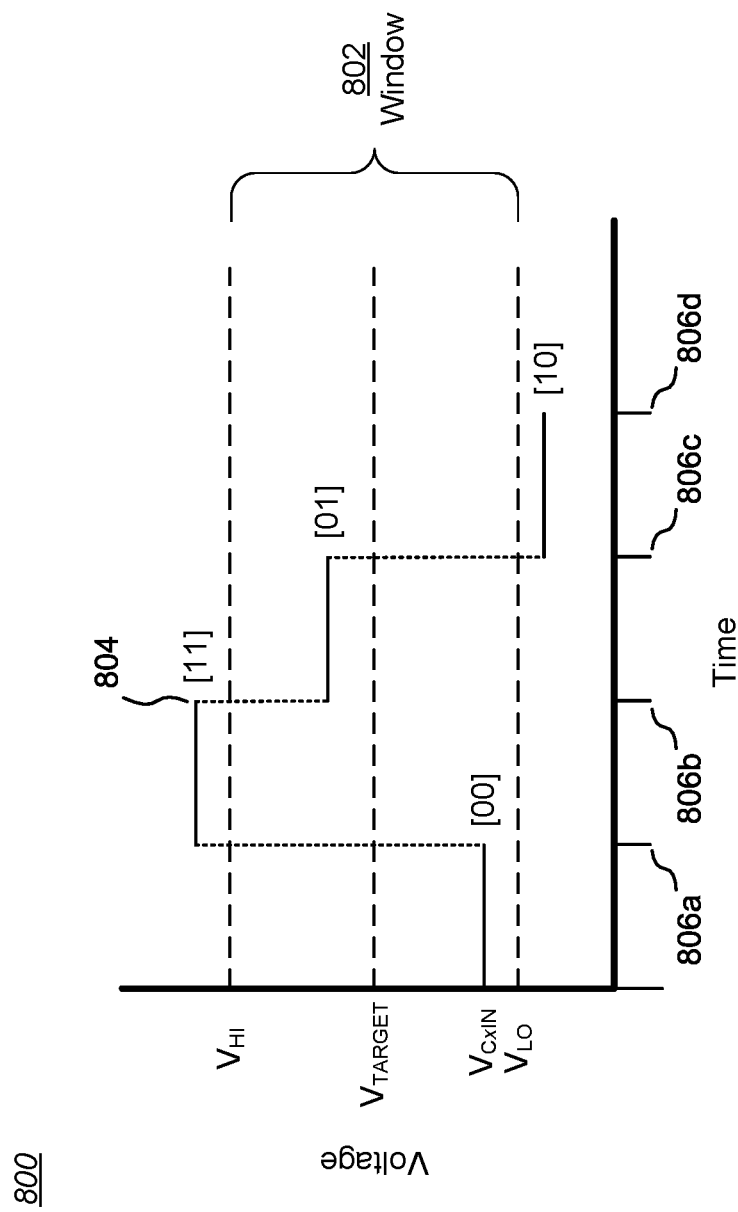
FIG. 8 is a graph of voltages versus time indicating example voltages for $V_{HI}$, $V_{TARGET}$, $V_{LO}$, and $V_{CxIN}$.

FIG. 8 is a graph 800 of voltages versus time indicating example voltages for $V_{HI}$, $V_{TARGET}$, $V_{LO}$, and $V_{CxIN}$. The span of voltages between $V_{HI}$ and $V_{LO}$ define a window 802 around $V_{TARGET}$ (note that the window 802 need not be symmetrically positioned around $V_{TARGET}$, although having a symmetrical window 802 is generally preferred). A graph line 804 shows several different values for $V_{CxIN}$ (representing $V_{Cx}$) in different time periods indicated by tick marks 806a-806d on the time dimension of the graph 800. Bracket values adjacent to different portions of the $V_{CxIN}$ graph line 804 indicate corresponding pairs of bits B1 (MSB) and B0 (LSB) that may be generated by the 2-bit fast flash ADC circuit 500 of FIG. 5.

For example, at tick mark 806a, the B1, B0 pair is [00], indicating that $V_{CxIN}$ is both below $V_{TARGET}$ and inside the window 802; at tick mark 806b, the B1, B0 pair is [11], indicating that $V_{CxIN}$ is both above $V_{TARGET}$ and outside the window 802; at tick mark 806c, the B1, B0 pair is [01], indicating that $V_{CxIN}$ is both above $V_{TARGET}$ and inside the window 802; and at tick mark 806d, the B1, B0 pair is [10], indicating that $V_{CxIN}$ is both below $V_{TARGET}$ and outside the window 802.

Referring back to FIG. 7, the 2-bit fast flash ADC circuit 700 may include a scalar circuit 710 for scaling $V_{Cx}$ for a particular fly capacitor Cx down to a suitable input voltage $V_{CxIN}$ for the comparators 702-706. For example, $V_{Cx}$ may be about 48V, and the corresponding scaled $V_{CxIN}$ may be about 2.4V.

The 2-bit fast flash ADC circuit 700 may also include a resistive voltage divider 712 including a set of resistors R0-R3 connected in series between a general reference voltage $V_{REF}$ (e.g., about 2.4V) and a reference potential 714, such as circuit ground. Some or all of the set of resistors R0-R3 maybe fixed or variable (variable instances of the set of resistors R0-R3 are shown in FIG. 7). In the case of variable resistors R0-R3, corresponding control signals $CTRL_{R0}$-$CTRL_{R3}$ may be provided by a controller 716 and coupled to the variable resistors R0-R3 to set associated resistance values.

The ratio of various subsets of the set of resistors R0-R3 provides different scaled voltages at nodes A, B, and C of the voltage divider 512. For example, a scaled voltage $V_{HI}$ is available at node A, where $V_{HI}=V_{REF}\times(R1+R2+R3)/(R0+R1+R2+R3)$. A scaled voltage $V_{TARGET}$ is available at node B, where $V_{TARGET}=V_{REF}\times(R2+R3)/(R0+R1+R2+R3)$. A scaled voltage $V_{LO}$ is available at node C, where $V_{LO}=V_{REF}\times(R3)/(R0+R1+R2+R3)$. Accordingly, $V_{HI}>V_{TARGET}>V_{LO}$. The respective values of the resistors R0-R3 may be settable (e.g., by laser trimming during manufacture) or adjustable (e.g., when assembled in a circuit module) or variable (e.g., by a programmed control signal from the controller 716).

Values for the set of resistors R0-R3 may be selected such that $V_{HI}>V_{TARGET}$ and $V_{TARGET}>V_{LO}$ by sufficient amounts to exceed the voltage ripple at the output of the associated power converter in order to prevent the voltage ripple from causing false indications of a capacitor being outside the high or low window voltage thresholds. Voltage ripple on a fly capacitor Cx is a function of at least the capacitance of that capacitor, the switching frequency of the associated power switches, and the load current of the power converter. It is not desirable to set a window size smaller than the steady-state voltage ripple such that a representative capacitor voltage $V_{CxIN}$ is constantly going outside of the target window. Since the voltage ripple is a function of the load current, the controller 716 may adjust the window size based on the load current.

The values for the set of resistors R0-R3 also should not be set so that the voltage range window defined by the high and low window voltage thresholds is too wide, which may result in no one fly capacitor being given priority for voltage balancing. Thus, a window size adjustment may be done to better optimize fly capacitor voltage balance priority. For example, if multiple fly capacitor voltages frequently fall outside the windows at the same time, no priority information can be obtained because all fly capacitors are out of balance. In such a case, the size of the window 802 in FIG.

8 may be increased to allow certain fly capacitor voltages to be inside the window 802 while other fly capacitor voltages fall outside the window 802 so that priority may be given to those fly capacitors falling outside the window 802. Window sizing may be done dynamically by the controller 716 to better optimize fly capacitor voltage balancing.

Note that, in preferred embodiments, the window size of all capacitors is adjusted together because the voltage balance algorithm is often based on a specific goal. For example, for the case where all fly capacitors Cx have equal voltage ripple (e.g., same capacitance at the target voltage of each capacitor), then it may be desirable to set the window size the same for all fly capacitors Cx. When there is a need to increase the window size when all fly capacitors Cx are outside the window, then the window size of all fly capacitors Cx may be increased by the same amount and vice versa. This will allow the controller to achieve voltage balance to within the same voltage delta of each fly capacitor Cx. For the case of a different capacitance for each fly capacitor Cx, the window may be scaled by the ratio of the capacitance, but again, all capacitor windows would be adjusted at the same time. In other embodiments, adjusting the size of one or more windows separately may be desirable. In some embodiments, a minimum window size may be set dynamically based on the voltage ripple plus some delta value, which depends mostly on the load current since the frequency and capacitance are fixed in most cases.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments that include this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 9:
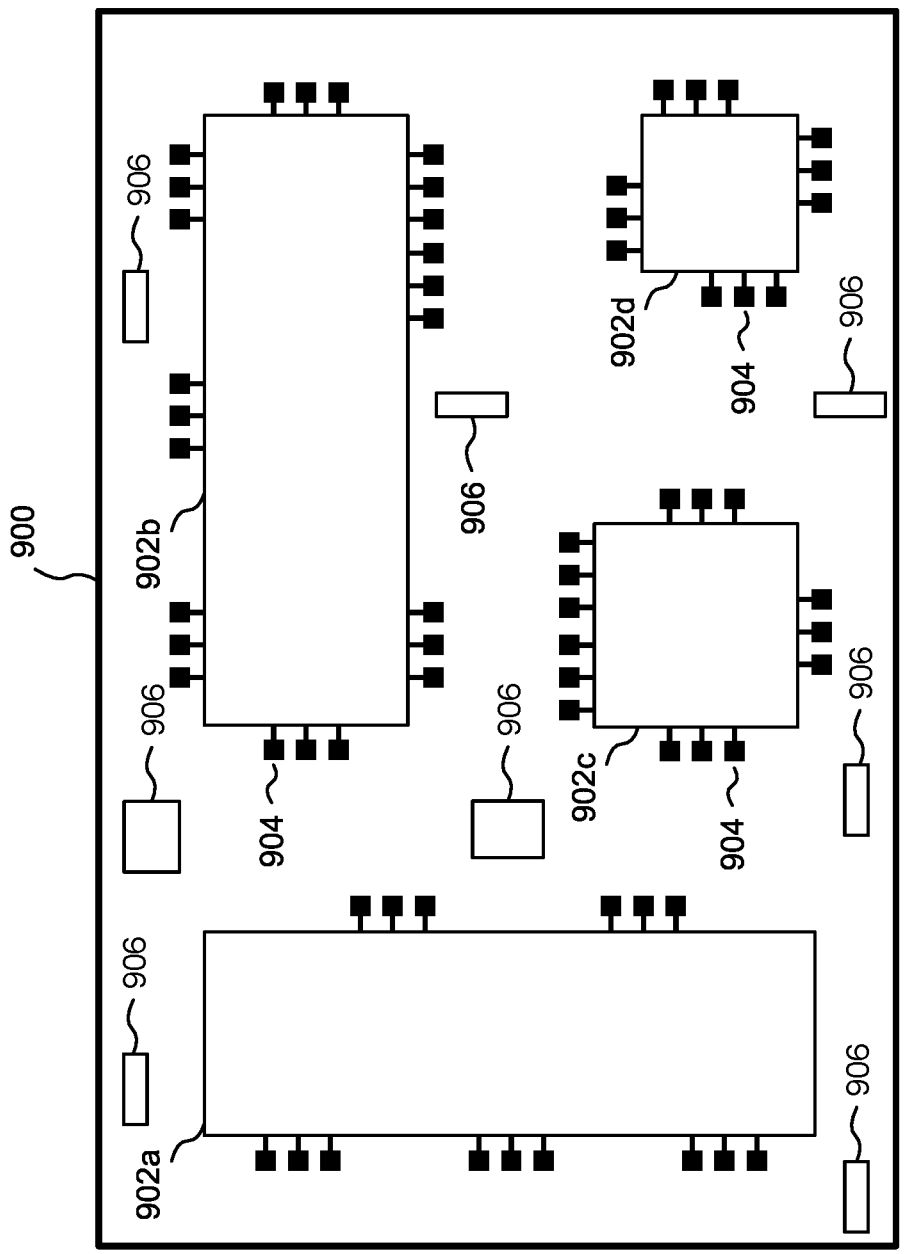
FIG. 9 is a top plan view of a substrate that may be, for example, a printed circuit board or chip module substrate (e.g., a thin-film tile).

As one example of further integration of embodiments of the present invention with other components, FIG. 9 is a top plan view of a substrate 900 that may be, for example, a printed circuit board or chip module substrate (e.g., a thin-film tile). In the illustrated example, the substrate 900 includes multiple ICs 902a-902d having terminal pads 904 which would be interconnected by conductive vias and/or traces on and/or within the substrate 900 or on the opposite (back) surface of the substrate 900 (to avoid clutter, the surface conductive traces are not shown and not all terminal pads are labelled). The ICs 902a-902d may embody, for example, signal switches, active filters, amplifiers (including one or more LNAs), and other circuitry. For example, IC 902b may incorporate one or more instances of a circuit like the circuits shown in FIGS. 5A, 6, and 7.

The substrate 900 may also include one or more passive devices 906 embedded in, formed on, and/or affixed to the substrate 900. While shown as generic rectangles, the passive devices 906 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 900 to other passive devices 906 and/or the individual ICs 902a-902d. The front or back surface of the substrate 900 may be used as a location for the formation of other structures.

Figure 10:
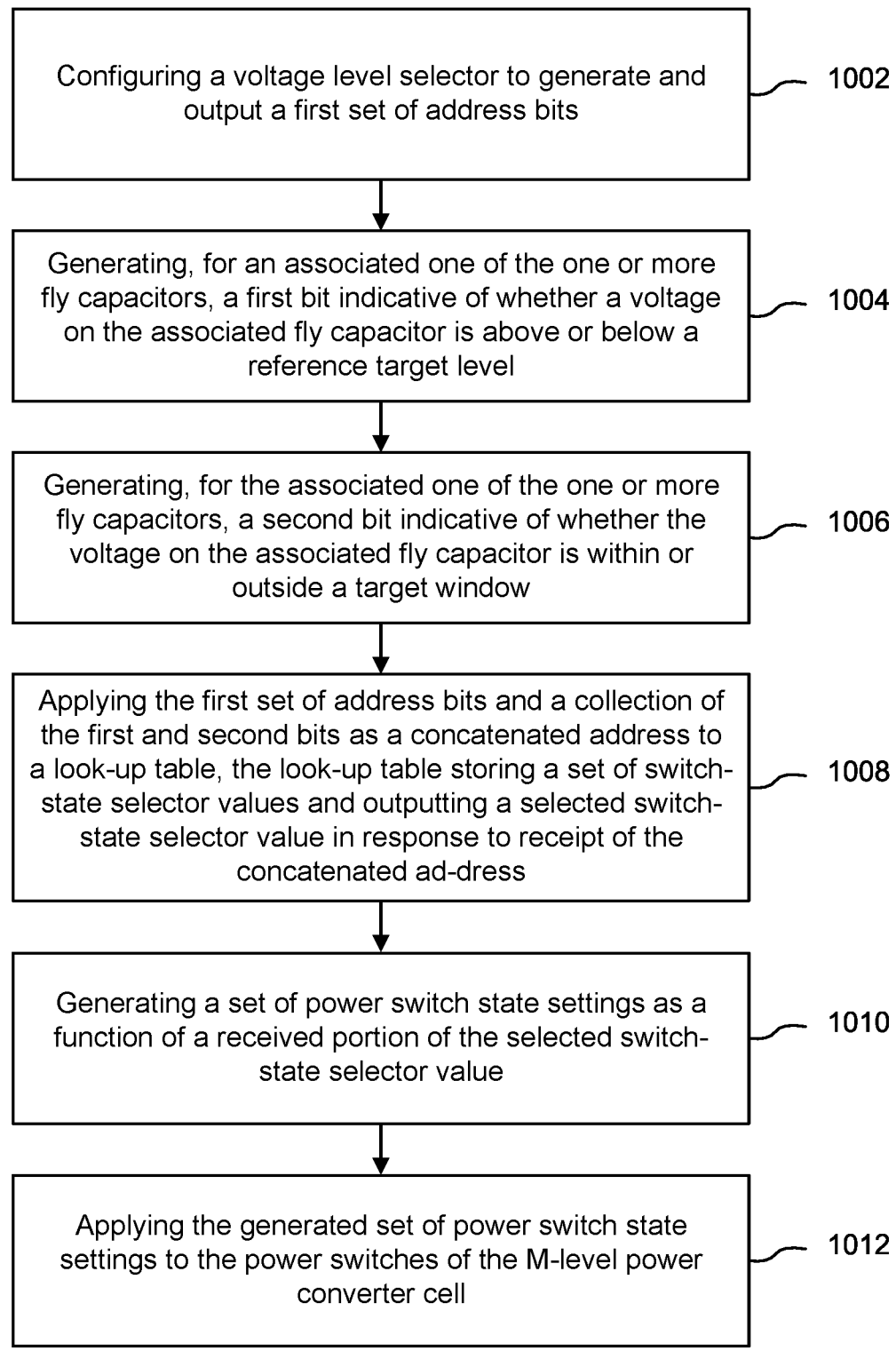
FIG. 10 is a process flow chart showing one method for controlling an M-level power converter cell having one or more fly capacitors coupled to a set of power switches, where M≥3.

Another aspect of the invention includes methods for controlling an M-level power converter cell. For example, FIG. 10 is a process flow chart 1000 showing one method for controlling an M-level power converter cell having one or more fly capacitors coupled to a set of power switches, where M≥3. The method includes: configuring a voltage level selector to generate and output a first set of address bits (Block 1002); generating, for an associated one of the one or more fly capacitors, a first bit indicative of whether a voltage on the associated fly capacitor is above or below a reference target level (Block 1004); generating, for the associated one of the one or more fly capacitors, a second bit indicative of whether the voltage on the associated fly capacitor is within or outside a target window (Block 1006); applying the first set of address bits and a collection of the first and second bits as a concatenated address to a look-up table, the look-up table storing a set of switch-state selector values and outputting a selected switch-state selector value in response to receipt of the concatenated address (Block 1008); generating a set of power switch state settings as a function of a received portion of the selected switch-state selector value (Block 1010); and applying the generated set of power switch state settings to the power switches of the M-level power converter cell (Block 1012).

Additional aspects of the above method may include one or more of the following: wherein the switch-state selector values stored in the look-up table are dynamically changeable; wherein the M-level power converter cell includes an output inductor, and the switch-state selector values each comprise a concatenation of a first switch-state selector value corresponding to a positive current through the inductor and a second switch-state selector value corresponding to a negative current through the inductor; and/or selectively providing one of the first switch-state selector value or the second switch-state selector value as the received portion of the selected switch-state selector value.

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main power switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "Apparatus and Method for Efficient Shutdown of Adiabatic Charge Pumps", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or power switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or power switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "Startup Detection for Parallel Power Converters", assigned to the assignee of the present invention, the contents of which are incorporated by reference.

Another consideration in operating multi-level converter cells is attaining (i.e., pre-charging) and maintaining fly capacitor voltages that are essentially fully proportionally balanced so that all power switches are subjected to a similar voltage stress, since unbalanced fly capacitors can lead to breakdown of a power switch (particularly FET power switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main power switch that is part of a multi-level converter cell (in some cases, one switch-resistor pair may span two series-connected power switches). This particular solution for pre-charging and/or balancing charge on fly capacitors is very fast, provides slow pre-charging of the fly capacitors during a pre-charge period, protects power switches from in-rush current, and provides stable voltages for converter cell power switches. Details of this solution, as well as alternative pre-charging and charge balancing solutions, are taught in U.S. Pat. No. 10,720,843, issued Jul. 21, 2020, entitled "Multi-Level DC-DC Converter with Lossy Voltage Balancing", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main power switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "Multi-Level DC-DC Converter with Lossless Voltage Balancing", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell power switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "Multi-Level DC-DC Converter with Boundary Transition Control", assigned to the assignee of the present invention, the contents of which are incorporated by reference.

Yet another consideration for some embodiments is protection of the main power switches and other components within a power converter from stress conditions, particular from voltages that exceed the breakdown voltage of such power switches (particularly FET switches). One means for protecting a multi-level power converter uses at least one high-voltage FET power switch while allowing all or most other main power switches to be low-voltage FET switches.

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

As should be clear, the multi-level power converter embodiments described in this disclosure may be synergistically combined with the teachings of one or more of the additional control and operational circuits and methods described in this section.

Embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

More particularly, multi-level power converters provide or enable numerous benefits and advantages, including:
  adaptability to applications in which input and/or output voltages may have a wide dynamic-range (e.g., varying battery input voltage levels, varying output voltages);
  efficiency improvements on the run-time of devices operating on portable electrical energy sources (batteries, generators or fuel cells using liquid or gaseous fuels, solar cells, etc.);
  efficiency improvements where efficiency is important for thermal management, particularly to protect other components (e.g., displays, nearby ICs) from excessive heat;
  enabling design optimizations for power efficiency, power density, and form-factor of the power converter—for example, smaller-size multi-level power converters may allow placing power converters in close proximity to loads, thus increasing efficiency, and/or to lower an overall bill of materials;
  the ability to take advantage of the performance of smaller, low voltage transistors;
  adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);
  adaptability to applications in which loads may vary widely, such as ICs in general (including microprocessors and memory ICs), electrical motors and actuators, transducers, sensors, and displays (e.g., LCDs and LEDs of all types);
  the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 4G, and WiFi (e.g., 802.11a, b, g, ac, ax), as well as other radio communication standards and protocols.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies.

However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A controller for an M-level power converter cell having one or more fly capacitors coupled to a set of power switches, where M≥3, the controller including:
    a voltage level selector configured to generate and output a first set of address bits;
    a set of one or more analog-to-digital converters, each analog-to-digital converter of the set configured to be coupled to an associated fly capacitor of the one or more fly capacitors and to output a set of bits indicative of a voltage on the associated fly capacitor in comparison to at least one voltage level, wherein at least a first bit and a second bit of the set of bits corresponding to each of the set of one or more analog-to-digital converters collectively comprises a second set of address bits; and
    a look-up table, coupled to the voltage level selector and to the set of one or more analog-to-digital converters, the look-up table configured to store a set of switch-state selector values and to output to the M-level power converter cell a selected switch-state selector value in response to receipt of an address comprising a concatenation of the first set of address bits and the second set of address bits.

2. The controller of claim 1, wherein the first bit is indicative of whether a voltage on the associated fly capacitor is above or below a reference target level, and the second bit is indicative of whether the voltage on the associated fly capacitor is within or outside a target window.

3. The controller of claim 2, wherein each of the one or more analog-to-digital converters is a 2-bit analog-to-digital converter that includes:
    a voltage input configured to be coupled to a voltage from the associated fly capacitor;
    a comparator having a first input coupled to the voltage input and a second input coupled to a first reference voltage input, the comparator configured to output the first bit; and
    a circuit coupled to the voltage input, a second reference voltage input, and a third reference voltage input, the circuit configured to output the second bit, wherein the target window is defined by respective voltages on the second reference voltage input and the third reference voltage input.

4. The controller of claim 3, wherein the voltage from the associated fly capacitor is scaled before being coupled to the voltage input.

5. The controller of claim 3, wherein the first reference voltage input, the second reference voltage input, and the third reference voltage input respectively receive a first reference voltage, a second reference voltage, and a third reference voltage, wherein the second reference voltage is greater than the first reference voltage and the third reference voltage is less than the first reference voltage.

6. The controller of claim 2, wherein the controller is configured to prioritize a balancing of the associated fly capacitor for which the second bit indicates that the associated fly capacitor is outside the target window.

7. The controller of claim 1, further including an M-level switch state selector, coupled to the look-up table and configured to be coupled to the M-level power converter cell, to receive at least a portion of the selected switch-state selector value from the look-up table, and to generate a set of power switch state settings based at least in part on the received portion of the selected switch-state selector value.

8. The controller of claim 1, wherein the switch-state selector values stored in the look-up table are dynamically changeable.

9. The controller of claim 1, further including a microcontroller coupled to the look-up table and configured to dynamically load changed values of the switch-state selector values into the look-up table.

10. The controller of claim 1, wherein the M-level power converter cell includes an output inductor, and the switch-state selector values each comprise a concatenation of a first switch-state selector value corresponding to a positive current through the inductor and a second switch-state selector value corresponding to a negative current through the inductor.

11. An M-level power converter including:
    an M-level converter cell having one or more fly capacitors coupled to a set of power switches, where M≥3, and configured to generate an output voltage or current from an input voltage;
    a first controller coupled to the M-level converter cell and configured to output a pulse-width modulation signal in response to at least an output of the M-level converter cell;
    a second controller, coupled to the first controller to receive the pulse-width modulation signal, the second controller including:

a voltage level selector configured to generate and output a first set of address bits;

a set of one or more analog-to-digital converters, each analog-to-digital converter of the set configured to be coupled to an associated fly capacitor of the one or more fly capacitors and to output a set of bits indicative of a voltage on the associated fly capacitor in comparison to at least one voltage level, wherein at least a first bit and a second bit of the set of bits corresponding to each of the set of one or more analog-to-digital converters collectively comprises a second set of address bits; and a look-up table, coupled to the voltage level selector and to the set of one or more analog-to-digital converters, the look-up table configured to store a set of switch-state selector values and to output to the M-level converter cell a selected switch-state selector value in response to receipt of an address comprising a concatenation of the first set of address bits and the second set of address bits.

12. The M-level power converter of claim 11, wherein the first bit is indicative of whether a voltage on the associated fly capacitor is above or below a reference target level, and the second bit is indicative of whether the voltage on the associated fly capacitor is within or outside a target window.

13. The M-level power converter of claim 12, wherein each of the one or more analog-to-digital converters is a 2-bit analog-to-digital converter that includes:

a voltage input configured to be coupled to a voltage from the associated fly capacitor;

a comparator having a first input coupled to the voltage input and a second input coupled to a first reference voltage input, the comparator configured to output the first bit; and a circuit coupled to the voltage input, a second reference voltage input, and a third reference voltage input, the circuit configured to output the second bit, wherein the target window is defined by respective voltages on the second reference voltage input and the third reference voltage input.

14. The M-level power converter of claim 13, wherein the voltage from the associated fly capacitor is scaled before being coupled to the voltage input.

15. The M-level power converter of claim 13, wherein the first reference voltage input, the second reference voltage input, and the third reference voltage input respectively receive a first reference voltage, a second reference voltage, and a third reference voltage, wherein the second reference voltage is greater than the first reference voltage and the third reference voltage is less than the first reference voltage.

16. The M-level power converter of claim 11, further including an M-level switch state selector, coupled to the look-up table and configured to be coupled to the M-level converter cell, to receive at least a portion of the selected switch-state selector value from the look-up table, and to generate a set of power switch state settings based at least in part on the received portion of the selected switch-state selector value.

17. The M-level power converter of claim 11, wherein the switch-state selector values stored in the look-up table are dynamically changeable.

18. The M-level power converter of claim 11, wherein the M-level converter cell includes an output inductor, and the switch-state selector values each comprise a concatenation of a first switch-state selector value corresponding to a positive current through the output inductor and a second switch-state selector value corresponding to a negative current through the output inductor.

19. A method for controlling an M-level power converter cell having one or more fly capacitors coupled to a set of power switches, where $M \geq 3$, the method including:

configuring a voltage level selector to generate and output a first set of address bits;

generating, for an associated one of the one or more fly capacitors, at least a first bit indicative of whether a voltage on the associated fly capacitor is above or below a reference target level;

generating, for the associated one of the one or more fly capacitors, at least a second bit indicative of whether the voltage on the associated fly capacitor is within or outside a target window;

applying the first set of address bits and a collection of the at least first and second bits to a look-up table, the look-up table storing a set of switch-state selector values;

outputting a selected switch-state selector value in response to receipt of the first set of address bits and the collection of the at least first and second bits at the lookup table;

generating a set of power switch state settings as a function of a received portion of the selected switch-state selector value; and applying the generated set of power switch state settings to the power switches of the M-level power converter cell.

20. The method of claim 19, wherein the switch-state selector values stored in the look-up table are selectively updatable.

21. The method of claim 19, wherein the M-level power converter cell includes an output inductor, and the switch-state selector values each comprise a concatenation of a first switch-state selector value corresponding to a positive current through the output inductor and a second switch-state selector value corresponding to a negative current through the output inductor.

* * * * *